US012764694B2

(12) United States Patent
Shekhar et al.

(10) Patent No.: US 12,764,694 B2
(45) Date of Patent: Oct. 13, 2026

(54) TECHNIQUES TO FACILITATE NETWORK SLICE SERVICE CONTINUITY FOR MOBILE NETWORK ENVIRONMENTS

(71) Applicant: Cisco Technology, Inc., San Jose, CA (US)

(72) Inventors: Ravi Shekhar, Pune (IN); Dishant Mukesh Parikh, Pune (IN); Vimal Srivastava, Bengaluru (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 413 days.

(21) Appl. No.: 18/490,247

(22) Filed: Oct. 19, 2023

(65) Prior Publication Data

US 2025/0133527 A1 Apr. 24, 2025

(51) Int. Cl.
*H04W 4/00* (2018.01)
*H04W 48/18* (2009.01)
*H04W 60/04* (2009.01)

(52) U.S. Cl.
CPC ........... *H04W 60/04* (2013.01); *H04W 48/18* (2013.01)

(58) Field of Classification Search
None
See application file for complete search history.

(56) References Cited

U.S. PATENT DOCUMENTS 11,722,928 B1 * 8/2023 Marupaduga ......... H04W 36/13 370/329
2021/0058858 A1 2/2021 Qiao et al.

(Continued)

FOREIGN PATENT DOCUMENTS

WO 2023049744 A1 3/2023
WO WO-2023237985 A1 * 12/2023 ........... H04W 48/18
WO WO-2025074382 A1 * 4/2025 ........... H04W 60/04

OTHER PUBLICATIONS

3GPP, "3rd Generation Partnership Project; Technical Specification Group Core Network and Terminals; 5G System; Network Slice Admission Control Services; Stage 3(Release 18)," 3GPP TS 29.536 V18.3.0, Sep. 2023, 85 pages.

(Continued)

*Primary Examiner* — Zewdu A Beyen

(74) *Attorney, Agent, or Firm* — Edell, Shapiro & Finnan, LLC

(57) ABSTRACT

Provided herein are techniques to facilitate network slice service continuity in a mobile network environment. In one example, a method may include for a registration request involving a user equipment (UE), obtaining, by an Access and Mobility Management Function (AMF), subscription information identifying primary network slices backup network slices to which the UE is subscribed in which each of the primary network slices and the backup network slices are active network slices capable of actively handling sessions for multiple UEs. The method may further include determining whether there is registration capacity for the UE with each of the network slices with which the UE is allowed registration. Based on the determining that there is registration capacity for registration of the UE, the AMF can transmit a registration response to the UE that indicating registration with the first primary network slice and the first backup network slice is accepted.

20 Claims, 13 Drawing Sheets

(56) References Cited

U.S. PATENT DOCUMENTS

| | | | |
|---|---|---|---|
| 2021/0211874 | A1 | 7/2021 | Salkintzis |
| 2023/0022184 | A1 | 1/2023 | Sajjan et al. |

OTHER PUBLICATIONS

3GPP, "3rd Generation Partnership Project; Technical Specification Group Core Network and Terminals; 5G System; Network Slice Selection Services; Stage 3(Release 18)," 3GPP TS 29.531 V18.4.0, Sep. 2023, 82 pages.

3GPP, "3rd Generation Partnership Project; Technical Specification Group Core Network and Terminals; 5G System; Unified Data Management Services; Stage 3(Release 18)," 3GPP TS 29.503 V18.3.0, Sep. 2023, 625 pages.

3GPP, "3rd Generation Partnership Project; Technical Specification Group Core Network and Terminals; Non-Access-Stratum (NAS) Protocol for 5G System (5GS); Stage 3, (Release 18)," 3GPP TS 24.501 V18.4.0, Sep. 2023, 1127 pages.

3GPP, "3rd Generation Partnership Project; Technical Specification Group Services and System Aspects; Procedures for the 5G System (5GS); Stage 2(Release 18)," 3GPP TS 23.502 V18.3.0, Sep. 2023, 889 pages.

3GPP, "3rd Generation Partnership Project; Technical Specification Group Services and System Aspects; Study on Enhancement of Network Slicing; Phase 3(Release 18)," 3GPP TR 23.700-41 V18.0.0, Dec. 2022, 166 pages.

3GPP, "3rd Generation Partnership Project; Technical Specification Group Services and System Aspects; System Architecture for the 5G System (5GS); Stage 2(Release 18)," 3GPP TS 23.501 V18.3.0, Sep. 2023, 686 pages.

ETSI, "5G; 5G System; Network Slice Admission Control Services; Stage 3 (3GPP TS 29.536 version 17.3.0 Release 17)," ETSI TS 129 536 V17.3.0, Jul. 2023, 65 Pages.

ETSI, "5G; 5G System; Network Slice Selection Services; Stage 3 (3GPP TS 29.531 version 17.7.0 Release 17)," ETSI TS 129 531 V17.7.0, Apr. 2023, 87 Pages.

ETSI, "5G; 5G System; Unified Data Management Services; Stage 3 (3GPP TS 29.503 version 17.12.0 Release 17)," ETSI TS 129 503 V17.12.0, Sep. 2023, 558 Pages.

ETSI, "5G; Non-Access-Stratum (NAS) Protocol for 5G System (5GS); Stage 3 (3GPP TS 24.501 version 17.12.0 Release 17)," ETSI TS 124 501 V17.12.0, Oct. 2023, 993 Pages.

ETSI, "5G; Procedures for the 5G System (5GS) (3GPP TS 23.502 version 17.10.0 Release 17)," ETSI TS 123 502 V17.10.0, Sep. 2023, 753 Pages.

ETSI, "5G; System Architecture for the 5G System (5GS) (3GPP TS 23.501 version 17.10.0 Release 17)," ETSI TS 123 501 V17.10.0, Sep. 2023, 575 Pages.

* cited by examiner

Enhanced 'NSSAI' Data Type
300

| Attribute Name | Data Type | Description |
|---|---|---|
| supportedFeatures | • • • | Defined as per 3GPP TS 29.503 • • • |
| defaultSingleNssais | | |
| singleNssais | | |
| BackupsingleNSSAIs | array(Snssai) | List of non-default Backup Single NSSAIs |
| • • • | • • • | Defined as per 3GPP TS 29.503 • • • |

302
304

FIG.3A

Enhanced 'SliceInfoForRegistration' Data Type
320

| Attribute Name | Data Type | Description |
|---|---|---|
| subscribedNssai (322) | Defined as per 3GPP TS 29.531 | |
| BackupsubscribedNSSAI (324) | array(SubscribedSnssai) | This IE can be included during the initial registration procedure for providing BackupSubscribedNSSAI |
| ... | ... Defined as per 3GPP TS 29.531 | ... |

FIG.3B

Enhanced 'AuthorizedNetworkSliceInfo' Data Type 340

| Attribute Name | Data Type | Description |
|---|---|---|
| 342 allowedNssaiList | Defined as per 3GPP TS 29.531 | |
| 344 BackupallowedNssaiList | array(AllowedNssai) | This IE can be included for indicating backupallowedNssaiList |
| • • • | • • • Defined as per 3GPP TS 29.531 | • • • |

FIG.3C

TECHNIQUES TO FACILITATE NETWORK SLICE SERVICE CONTINUITY FOR MOBILE NETWORK ENVIRONMENTS

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. With the introduction of mobile network slicing architectures, new opportunities have been created for improving communications and services that can be offered to both wireless providers and wireless devices that utilize mobile communication networks.

BRIEF DESCRIPTION OF THE DRAWINGS

FIG. 3A is a schematic diagram illustrating example details regarding an enhanced data type that can be used to identify backup network slice information for a user equipment for a communication sent from a Unified Data Management (UDM) entity to an Access and Mobility Management Function (AMF) in order to facilitate network slice service continuity in connection with embodiments herein.

FIG. 3B is a schematic diagram illustrating example details regarding an enhance data type that can be used to identify backup network slice information for a user equipment for a communication sent from an Access and Mobility Management Function (AMF) to a Network Slice Selection Function (NSSF) in order to facilitate network slice service continuity in connection with embodiments herein.

FIG. 3C is a schematic diagram illustrating example details regarding an enhanced data type that can be used to identify backup slice information for a user equipment for a communication sent from a Network Slice Selection Function (NSSF) to an Access and Mobility Management Function (AMF) in order to facilitate network slice service continuity in connection with embodiments herein.

DETAILED DESCRIPTION

Overview

Figure 1:
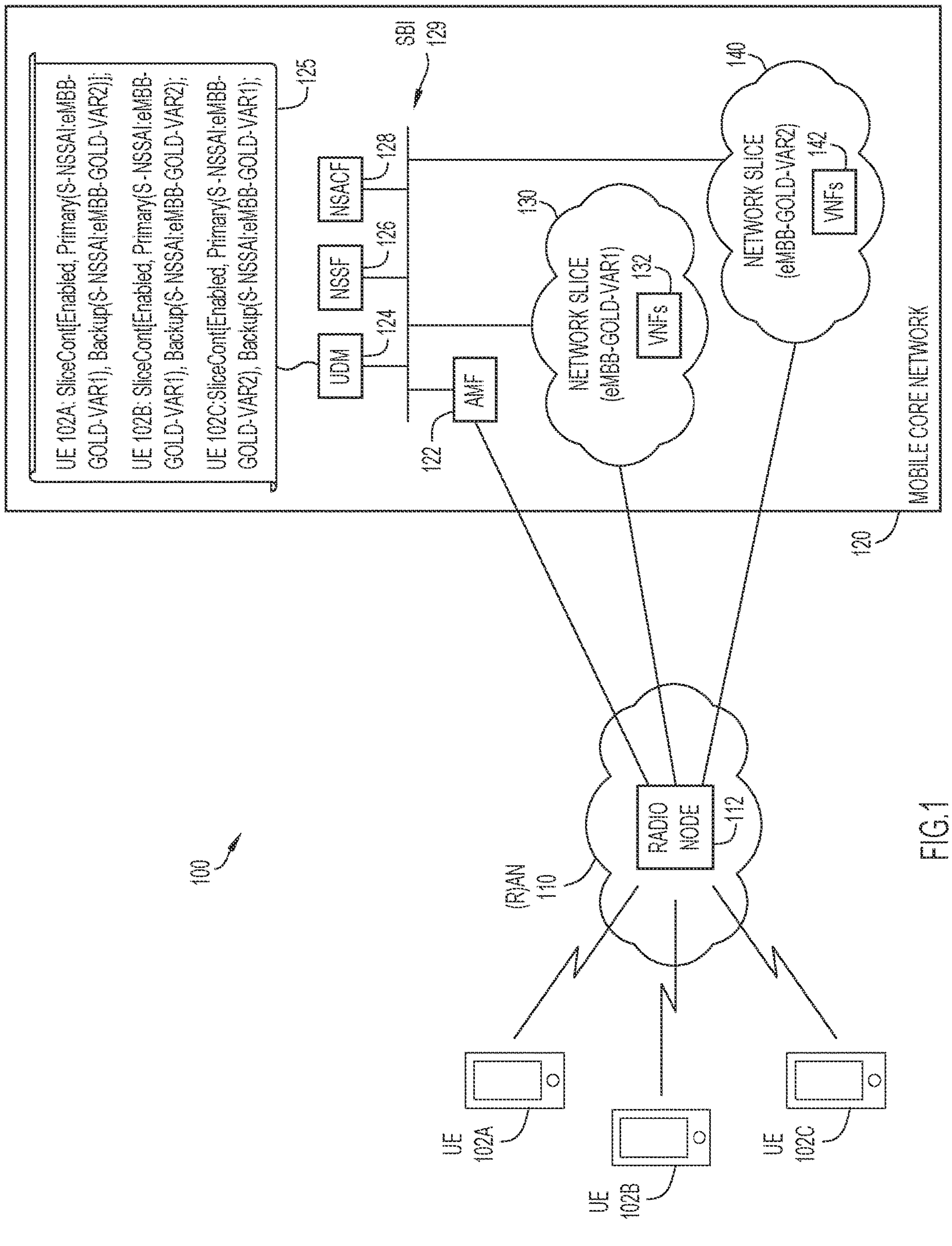
FIG. 1 illustrates a system in which network slice service continuity may be provided within a mobile network, according to an example embodiment.

Provided herein are techniques to facilitate network slice service continuity for a mobile network environment. With slice-based deployment provided for a mobile network, slice continuity will help in providing continuous services to end users, such as, for example, when a UE moves out of the coverage area of a given network slice instance or a serving network slice instance becomes unavailable for some reason. Accordingly, embodiments as provided herein may help a mobile network operator to maintain network slice service continuity for mobility scenarios in which a UE may move out of the coverage area of a network slice instance and/or may minimize impact to UE services during overload situations or maintenance activities in other scenarios.

In at least one embodiment, a computer-implemented method is provided that may facilitate network slice service continuity for a mobile network environment. For example, in at least one embodiment, a computer-implemented method is provided that may include, for a registration request involving a first user equipment (UE), obtaining, by an Access and Mobility Management Function (AMF), subscription information for the first UE identifying one or more primary network slices and one or more backup network slices to which the first UE is subscribed, wherein each primary network slice of the one or more primary network slices is associated with a corresponding backup network slice of the one or more backup network slices and each of the one or more primary network slices and the one or more backup network slices are active network slices capable of actively handling sessions for a plurality of user equipment; obtaining, by the AMF, registration information for the first UE identifying, based at least in part on the subscription information, a first primary network slice of the one or more primary network slices and a first backup network slice of the one or more backup network slices with which the first UE is allowed registration; determining, by the AMF, whether there is registration capacity for registration of the first UE with the first primary network slice and the first backup network slice; and based on the determining that there is registration capacity for registration of the first UE with the first primary network slice and the first backup network slice, transmitting a registration response to the first UE that indicates that registration with the first primary network slice and the first backup network slice is accepted.

Example Embodiments

Network slicing is a concept that has been introduced for Third Generation Partnership Project (3GPP) mobile core network architectures. A network slice is a logical end-to-end network, often instantiated via a combination of slice resources, such as virtualized network functions (VNFs), in which the network slice can be dynamically created (instantiated) and may include any combination of 3GPP mobile core network functions/functionality. Thus, a network slice can generally refer to a group or set of slice resources that are configured and instantiated in order to facilitate mobile network services. As referred to herein, a mobile core network can be referred to interchangeably as a mobile network.

A network slice instance that has been instantiated within a Public Land Mobile Network (PLMN) can include any combination of core network control plane and user plane network functions. Per-3GPP Technical Specification (TS)

23.501, Section 5.15.2, Single-Network Slice Selection Assistance Information (S-NSSAI or SNSSAI) can be used to uniquely identify a network slice in which an S-NSSAI includes a Slice/Service Type (SST) indication that indicates the expected slice behavior for a network slice in terms of expected features and services, and, optionally, can include a Slice Differentiator (SD), which can be used to differentiate among multiple slices of a same SST. Different types of network slices (network slice types) can be configured for a mobile network such that each network slice type can provide certain mobile network services.

Various example network slice types can include, but not be limited to, a cellular vehicle to everything (V2X) network slice type that can provide cellular V2X services, a massive IoT (mIoT) network slice type that can provide IoT related services, an Ultra-Reliable Low-Latency Communication (URLLC) network slice type that can provide URLLC services, an enhanced Mobile Broadband (eMBB) network slice type that can provide mobile broadband services, a massive Machine-Type Communication (mMTC) network slice type that can provide MTC services, a High Performance Machine-Type Communication (HMTC) network slice type that can provide HMTC services, etc. Other slice types can be configured/instantiated by a mobile network operator that may or may not conform to standards-based network slice types.

In 3GPP mobile network environments, such as for a Fifth Generation (5G)-as-a-Service (5GaaS) deployment, many different slices can be used to serve different use cases and many slice instances can be used to support different scalability scenarios. In the current 5G system (5GS) architecture, a network slice instance may be associated with one or more S-NSSAIs in a PLMN and each S-NSSAI may utilize different network resources or 5G core (5GC) network functions (NFs). For example, 5GC NFs such as an Access and Mobility Management Function (AMF), a Session Management Function (SMF), and a User Plane Function (UPF) can be configured to support S-NSSAIs that are associated with a network slice instance during deployment of a 5G mobile network.

For large deployments, there can be many slice instances of a same type; for example, a mobile network operator (MNO) may deploy multiple instances of an eMBB type network slice providing a level of service (e.g., a gold or premium level of service) for different regions, such as a first region (e.g., region ‘A’) that can be identified as ‘eMBB-gold-regionA’ and a second region (e.g., region ‘B’) that can be identified as ‘eMBB-gold-regionB’ that are the same slices that can service wireless devices in different regions.

It should be noted that although network slice area of service is defined in 3GPP standards, there could be scenarios in which multiple variants of a same slice type (e.g., an ‘eMBB-gold’ slice type) could have a first variant (e.g., variant ‘1’) that could be identified as ‘eMBB-gold-variant1’ and a second variant (e.g., variant ‘2’) that could be identified as ‘eMBB-gold-variant2’. Such scenarios may be useful in a 5GaaS hosted multi-tenant deployment in which many slice variants (serving different tenants, for example) are hosted together.

Given, that multiple slice instances can be deployed and a wireless device (often referred to as a user equipment (UE)) is allowed to access these slices, facilitating service continuity across these slices is a challenge and is currently being studied based on 3GPP Technical Report (TR) 23.700-41, version 18.0.0 (Release 18), published December 2022 in which the need for service continuity can arise from device mobility or when a given network slice is overloaded, is undergoing planned maintenance, and/or is not able to meet a given Service-Level Agreement (SLA).

In accordance with embodiments herein, techniques are provided that may facilitate network slice service continuity for a mobile network environment in order to address slice continuity issues that may arise for both roaming and/or non-roaming related scenarios/use cases.

Referring to FIG. 1, FIG. 1 illustrates a system 100 in which network slice service may be provided for a mobile network, according to an example embodiment. In at least one embodiment, system 100 may include an access network, which may include wired and wireless accesses and may be referred to as (R)AN 110, and a mobile core network 120. Also shown in FIG. 1 are wireless devices, referred to herein interchangeably as user equipment (UE), such as a 102A, a UE 102B, and a UE 102C.

(R)AN 110 may include a radio node 112 that may facilitate wireless Radio Frequency (RF) cover. Mobile core network 120 may include an Access and Mobility Management Function (AMF) 122, a Unified Data Management (UDM) entity 124, a Network Slice Selection Function (NSSF) 126, a Network Slice Admission Control Function (NSACF) 128, and a number of network slices (slice instances), for a given network slice type, such as an eMBB network slice offering a gold or premium level of services, referred to herein as an ‘eMBB-GOLD’ network slice. UDM 124 stores subscription data typically in combination with a Unified Data Repository (UDR) (not shown in FIG. 1 for purposes of brevity only); thus, a UDM can be referred to as a UDM/UDR in some instances.

For FIG. 1, an instance of a network slice 130 (e.g., an instantiated network slice) of the eMBB-GOLD type network slice is shown that be identified via a first SST/SD as a first variant of the eMBB-gold type network slice identified and referred to herein using a Single-Network Slice Selection Assistance Information (S-NSSAI) identifier of ‘eMBB-GOLD-VAR1’ (S-NSSAI=eMBB-GOLD-VAR1). Also shown in FIG. 1 is an instance a network slice 140 of the eMBB-GOLD type network slice that be identified via a second SST/SD as a second variant of the eMBB-gold type network slice, identified and referred to herein using a second S-NSSAI identifier of ‘eMBB-GOLD-VAR2’ (S-NSSAI=eMBB-GOLD-VAR2).

Note, numerical values for the first SST/SD (S-NSSAI) and the second SST/SD (S-NSSAI) are not identified herein, but it is to be understood that the first SST/SD (S-NSSAI) and the second SST/SD (S-NSSAI) can be represented using any alphanumeric representation in accordance with 3GPP specifications. Further, it is to be understood that network slice 130 is an instance of the eMBB-GOLD-VAR1 network slice type and that network slice 140 is an instance of the eMBB-GOLD-VAR2 network slice type. Thus, as referred to herein and in the claims, the terms ‘network slice’, ‘network slice instance’, ‘network slice (instance)’ may be used interchangeably to refer to an instantiated network slice of a given slice type (e.g., eMBB-GOLD-VAR1, eMBB-GOLD-VAR2, etc.).

The network slice 130 can include any number of VNFs 132 (e.g., SMF, UPF, etc.) configured to facilitate eMBB services for the network slice 130 at the ‘Gold’ level of service and the network slice 140 can include any number of VNFs 142 (e.g., SMF, UPF, etc.) configured to facilitate eMBB services for the network slice 140 at the ‘Gold’ level of service. Thus, in accordance with embodiments herein, each of network slice 130 and network slice 140 are considered to provide the same network services (e.g., eMBB services) at the same service level (e.g., Gold). In some instances, AMF 122 may be considered to be a logical VNF that may be considered a part of each of network slice 130 and network slice 140.

As shown in FIG. 1, radio node 112 may interface with AMF 122 and each of network slice 130 and network slice 140 (e.g., with at least one UPF configured as at least one VNF for each network slice). Each of the AMF 122, the UDM 124, the NSSF 126, and the NSACF 128 may further interface with each other via a Service-Based Interface (SBI), shown in FIG. 1 as SBI 129. For example, the AMF 122 SBI reference point/interface is typically referred to as the 'Namf' interface/reference point, the UDM 124 SBI reference point/interface is typically referred to as the 'Nudm' interface/reference point, the NSSF 126 reference point/interface is typically referred to as the 'Nnssf' interface/reference point, and the NSACF 128 SBI reference point/interface is typically referred to as the 'Nnsacf' interface/reference point. AMF 122 as well as any of NSSF 126, UDM 124, NSACF 128 and any other functions interfacing with SBI 129 may also interface with of network slice 130 and network slice 140 (e.g., with at least one SMF configured as at least one VNF for each network slice and/or any other control plane VNFs that may be configured for each network slice) via SBI 129. Although only one interface connection between SBI 129 and each of network slice 130 and network slice 140 is shown in FIG. 1, it is to be understood that any interface/reference points may be facilitated between any VNFs 132 of network slice 130 and any VNFs 142 of network slice 140 and SBI 129 to facilitate any communications with any elements interfacing via SBI 129.

In the current 5GC architecture, baseline Release (R17), there are at least two mobile core network functions, such as the NSSF and the NSACF that can assist, respectively, in network slice selection and admission control procedures. Generally, during operation, the NSSF performs the initial slice selection and decides the list of slices that a wireless device is allowed to use based on current network condition, wireless device location, wireless device subscription information, operator policy etc., and the NSCAF performs slice admission control by monitoring and controlling number of wireless devices and/or wireless device Protocol Data Unit (PDU) sessions per network slice instance.

In accordance with embodiments herein, the AMF 122, the UDM 124, the NSSF 126, and the NSACF 128 can be enhanced with additional functionality to facilitate network slice service continuity for network slices that can be implemented through both primary and backup network slices for each of one or more network slice types that may be supported/provided via mobile core network 120 for one or more mobile network operator(s) (MNO(s)).

Techniques herein may be facilitated via subscription-based services that can be identified for one or more wireless devices, such as UE 102A, UE 102B, and UE 102C in order to provide support for slice continuity services that can be facilitated via system 100.

In at least one embodiment, UDM 124 can be updated with subscription information for each of UE 102A. 102B, and 102C that identifies that each UE is subscribed to slice continuity services that may be facilitated via system 100. Further, in at least one embodiment, the subscription information for each of UE 102A. 102B, and 102C, for which slice continuity services are enabled, can be further enhanced to identify lists of one or more primary network slices and one or more corresponding backup network slices to which each UE is subscribed (e.g., is subscribed to receive service).

It is to be understood that that UEs for which slice continuity services are not enabled, may not include subscription information that identifies primary and backup network slices subscribed thereto.

In accordance with embodiments herein, each of a primary network slice and a corresponding backup network slice may be considered as primary/backup pair of network slices that provide the same network services for a UE. For example, each of network slice 130 and network slice 140 are considered to provide the same network services (e.g., eMBB services) at the same service level (e.g., Gold). Thus, one of network slices 130 or 140 may be configured as the primary network slice for a given UE (via subscription information provided for the UE) and the other of network slices 130 or 140 may be configured as the backup network slice for the given UE in order to facilitate slice service continuity for the given UE in accordance with embodiments herein.

Further in accordance with embodiments primary and backup network slices configured for a UE are not considered Active and Standby types of network slices. Rather, in accordance with embodiments herein, both of a primary network slice (instance) and a backup network slice (instance) are considered to operate as Active network slice instances that an MNO has configured such that multiple UEs can be registered to and be handled by both of the active primary and backup network slices depending on per-UE subscription information and NSSF/NSACF operations as discussed for embodiments herein. Thus, in some instances, a backup network slice may also be considered a secondary network slice.

For example, a first group of wireless devices, including UE 102A and UE 102B, may be assigned to use the network slice 130 as a primary network slice and to use network slice 140 as a backup network slice, while another group of wireless devices, that may, for example, include UE 102C, may be configured to use—at the same time—network slice 130 as backup network slice and network slice 140 as a primary network slice. Thus, some network slices may be configured as the (active) primary network slices for one set of UEs and the same network slices may be configured as the (active) backup network slices for another set of UEs.

Embodiments herein may ensure that the VNFs belonging to the primary and backup network slice instances for a same network slice are part of the same NF-set in order conform operation of the network slice instances with standards-based criteria as prescribed for the enhanced Service Based Architecture (eSBA) as defined in Release 16 of 3GPP standards such that context information for UEs can be shared among the VNFs (NFs).

At least two network slice service continuity use cases can be addressed in accordance with embodiments herein, as follows:

Use Case 1: Service continuity that may be triggered from wireless device roaming or a wireless device moving outside of the coverage area of a current serving network slice.

Use Case 2: Service continuity that may be triggered due to a current network slice instance becoming overloaded (e.g., having a maximum/threshold number of UEs registered therewith and/or thereby) and/or going down (e.g., due to maintenance purposes).

For each case, embodiments herein propose configuring subscription information identifying primary and backup network slice(s) via UDM 124 for each of the network slices to which a wireless device (UE) is subscribed. For example, consider various subscription data 125 for UDM 124 that may be configured for each of UE 102A, UE 102B, and UE 102C.

As shown in FIG. 1, subscription information for UE 102A contained in subscription data 125 configured for UDM 124 may identify that slice continuity service is enabled for the UE 102A and may include information that identifies that network slice 130 (eMBB-GOLD-VAR1) is a primary eMBB-GOLD network slice configured for the UE 102A and that network slice 140 (eMBB-GOLD-VAR2) is a backup eMBB-GOLD network slice configured for the UE 102A (e.g., 'UE 102A: SliceCont [Enabled, Primary(S-NSSAI: eMBB-GOLD-VAR1), Backup(S-NSSAI:eMBB-GOLD-VAR2)]'). It is to be understood that the subscription information for UE 102A could identify other primary/backup network slice pairs for other types of network slices to which the UE could be subscribed (e.g., a primary/backup pair of mIoT network slices, etc.), in accordance with embodiments herein.

Further, subscription information for UE 102B contained in subscription data 125 configured for UDM 124 may identify that slice continuity service is enabled for the UE 102B and may include subscription information for UE 102B that identifies that network slice 130 (eMBB-GOLD-VAR1) is a primary eMBB-GOLD network slice configured for the UE 102B and that network slice 140 (eMBB-GOLD-VAR2) is a backup eMBB-GOLD network slice configured for the UE 102B (e.g., 'UE 102B: SliceCont[Enabled, Primary (S-NSSAI:eMBB-GOLD-VAR1), Backup(S-NSSAI:eMBB-GOLD-VAR2)]'). It is to be understood that the subscription information for UE 102B could identify other primary/backup network slice pairs for other types of network slices to which the UE could be subscribed (e.g., a primary/backup pair of V2X network slices, etc.), in accordance with embodiments herein.

Further, subscription information for UE 102C contained in subscription data 125 configured for UDM 124 may identify that slice continuity service is enabled for the UE 102C and may include subscription information for UE 102C that identifies that network slice 140 (eMBB-GOLD-VAR2) is a primary eMBB-GOLD network slice configured for the UE 102C and that network slice 130 (eMBB-GOLD-VAR1) is a backup eMBB-GOLD network slice configured for the UE 102C (e.g., 'UE 102C: SliceCont[Enabled, Primary(S-NSSAI:eMBB-GOLD-VAR2), Backup(S-NSSAI:eMBB-GOLD-VAR1)]'). It is to be understood that the subscription information for UE 102C could identify other primary/backup network slice pairs for other types of network slices to which the UE could be subscribed (e.g., a primary/backup pair of mMTC network slices, etc.), in accordance with embodiments herein.

Thus, as shown in the example embodiment of FIG. 1, network slice 130 may be configured as a primary (active) eMBB-GOLD network slice to be utilized by UE 102A and UE 102B with network slice 140 configured as a backup (active) eMBB-GOLD network slice to be utilized by the UEs 102A and 102B (e.g., in case network slice 130 is overloaded and/or down); whereas network slice 140 is configured as a primary (active) eMBB-GOLD network slice to be utilized by UE 102C with network slice 140 configured as a backup (active) eMBB-GOLD network slice to be utilized by the UE 102C (e.g., in case network slice 140 is overloaded and/or down). Accordingly, both primary and backup network slices may be active network slices that can utilized by different UEs at the same time in order to facilitate slice service continuity in accordance with embodiments herein.

During operation of system 100, when a UE seeks registration with mobile core network. (e.g., a registration request is sent by the UE, via the (R)AN 110 towards AMF 122), the AMF 122 can obtain (based on receiving the registration request involving the UE) subscription information for the UE from UDM 124 that identifies whether the slice continuity service is enabled for the UE and, if slice continuity service is enabled for the UE, the UDM 124 can provide subscription information for the UE to AMF 122 that identifies the primary/backup networks slices to which the UE is subscribed.

Thereafter, the AMF 122 can query the NSSF 126 regarding the network slices identified in the subscription information for the UE in order to determine whether the UE is allowed to register with the identified/subscribed network slices. For example, some of the network slices to which UE is subscribed may not be available for/provided by the mobile core network 120 (e.g., may be out of service, overloaded, not provided/configured for the network, etc.), may be associated with an area of service not covered by the coverage area of (R)AN 110 (e.g., not allowed in the current location of the UE), and/or the like. Thus, there may be multiple reasons as to why network slices to which a UE is subscribed may be allowed by the NSSF 126 for mobile core network 120. Based on the query and, if applicable, any reasons for which certain network slice(s) may not be allowed for registration by the UE, the NSSF can send a response to the AMF 122 that includes registration information for the UE that identifies the primary network slices and the corresponding backup networks slices with which the UE is allowed registration.

In accordance with embodiments herein, an early admission control (EAC) mode update procedure can be utilized for both the primary and the backup (secondary) network slice with which a UE is allowed registration, unless a prior notification has been received that indicates that a registration capacity threshold has been met for one of the primary or the backup network slices.

Thus, an EAC mode can be enabled for the AMF 122 such that in at least one embodiment the AMF 122 can perform an availability check and update procedure with the NSACF 128 regarding the number of UEs registered per network slice before the network slices (S-NSSAIs) subjected to admission control for the UE can be included in the allowed NSSAI list(s) that may be sent to the UE for the UE's registration with the mobile core network.

In at least one embodiment for an availability check/update procedure involving a given primary network slice and a given backup network slice as initiated/queried by the AMF 122, the NSACF 128 can determine whether there is registration capacity for the given primary network slice and the given backup network slice for registration of the UE with each of the given primary and backup network slices.

Based on determining that there is registration capacity available for both of the given primary and the given backup network slice, the NSACF 128 can notify the AMF 122 that the there is registration capacity for the given primary network slice and the given backup network slice for registration with the UE. Based on determining, by the AMF 122, that there is registration capacity for registration of the UE for both of the primary network slice and the backup network slice, the AMF 122 can transmit a registration response to the UE (via the (R)AN 110) that identifies both the primary network slice and its corresponding backup network slice in allowed list(s) of network slices (allowed S-NSSAIs) for which registration for the UE is accepted.

Thereafter, the UE can use the primary network slice for Protocol Data Unit (PDU) session creation. During the PDU session creation, an SMF (not shown) of the given primary network slice can perform another availability check with the NSACF 128 to determine whether a session capacity threshold has been met for the given primary network slice. At that time, if the session capacity threshold for the given primary network slice has been met/satisfied or if the primary network slice happens to be down (e.g., for maintenance, etc.), the NSACF 128 may rejection PDU session creation for the UE. However, in accordance with embodiments herein, since the UE received both the primary network slice and the backup network slice in the allowed list of network slices during the registration procedure, the UE can automatically select the backup network slice with which to establish the PDU session without again having to perform another registration procedure with the mobile core network 120 specifically for the backup network slice. Thus, embodiments herein may facilitate slice service continuity in a manner that can reduce PDU session establishment time for cases in which a first network slice (e.g., primary) of a given slice type with which the UE is registered is not available for PDU session establishment (e.g., overloaded or down) such that a UE can automatically select a second network slice (e.g., backup) of the given slice type with which the UE is already registered.

In another scenario, such as for a mobility scenario in which a UE may move out of the coverage of a given primary network slice, the UE may fallback to utilize a corresponding backup network slice that may serve a different coverage area.

For the EAC mode, the AMF 122 may implicitly subscribe to an EAC notification for at least one network slice (S-NSSAI) when the AMF 122 performs a first network slice availability check and update procedure with the NSACF 128 for at least one network slice (S-NSSAI) included in the registration information that is obtained by the AMF 122 for the UE. The NSACF 128 can send an EAC mode notification towards all notification endpoints associated with a given network slice (S-NSSAI).

Upon subscribing to an EAC notification for a given network slice, such as a given primary network slice, the NSACF 128 can notify the AMF 122 when the registration capacity threshold for the given primary network slice is met. Thereafter, for another UE attempting to perform registration for the given primary network slice, the AMF 122 can automatically start to use the backup network slice corresponding to the primary network slice for registration admission control toward the NSACF 128. In such a scenario, if the primary network slice is not available for registration for the UE, the AMF 122, upon determining (from the NSACF 128) that there is registration capacity for registration of the other UE with the backup network slice, can send a registration response to the other UE that indicates that registration with the backup network slice is accepted, such that the backup network slice is identified in the allowed list of network slices (allowed S-NSSAIs) for which registration for the UE is accepted while the primary network slice is not identified in the allowed list of network slices.

At a later time, if capacity for the primary network slice becomes available, the NSACF 128 can notify the AMF 122 such that the AMF 122 can resume using the primary network slice for admission control toward the NSACF 128. Thus, network slice service continuity can be provided for different scenarios/use cases in accordance with various embodiments herein.

Consider various example operations that can be performed via system 100 as shown via FIGS. 2A, 2B, 2C, and 2D, which are a message sequence diagram 200 illustrating example operations that can be performed in order to facilitate network slice service continuity, in accordance with embodiments herein. For example, FIG. 2A, 2B, 2C, and 2D illustrate example operations that may be performed for wireless devices, such as each of UE 102A and UE 102B, each of which may perform a registration procedure with mobile core network 120.

UE 102A and UE 102B are not shown in FIGS. 2A, 2B, 2C, and 2D for purposes of brevity only in order to illustrate other features of system 100; however, each of UE 102A and UE 102B may be referenced in relation to operations described with reference to radio node 112, AMF 122, UDM 124, NSSF 126, and NSACF 128, which are shown in FIGS. 2A, 2B, 2C, and 2D. For the embodiment of FIGS. 2A, 2B, 2C, and 2D consider that subscription data 125, as shown in FIG. 1, is configured for UDM 124 (e.g., 'UE 102A: SliceCont[Enabled, Primary(S-NSSAI:eMBB-GOLD-VAR1), Backup(S-NSSAI:eMBB-GOLD-VAR2)]' and 'UE 102B: SliceCont[Enabled, Primary(S-NSSAI:eMBB-GOLD-VAR1), Backup(S-NSSAI: eMBB-GOLD-VAR2)] ').

For the discussion of FIGS. 2A, 2B, 2C, and 2D reference is made to each of FIGS. 3A, 3B, and 3C, which are schematic diagrams illustrating example details of enhanced datatypes that can be used in messaging between various elements of system 100 in order to facilitate network slice service continuity features of embodiments herein.

For the embodiment of FIGS. 2A, 2B, 2C, and 2D consider that the EAC mode is enabled for AMF 122, as shown at 201, and that registration capacity thresholds are configured for each of network slice 130 (S-NSSAI:eMBB-GOLD-VAR1) and network slice 140 (S-NSSAI: eMBB-GOLD-VAR2), as shown at 202. Although not shown in FIGS. 2A, 2B, 2C, and 2D, PDU session capacity thresholds can also be configured for each of the network slices.

Figure 2A:
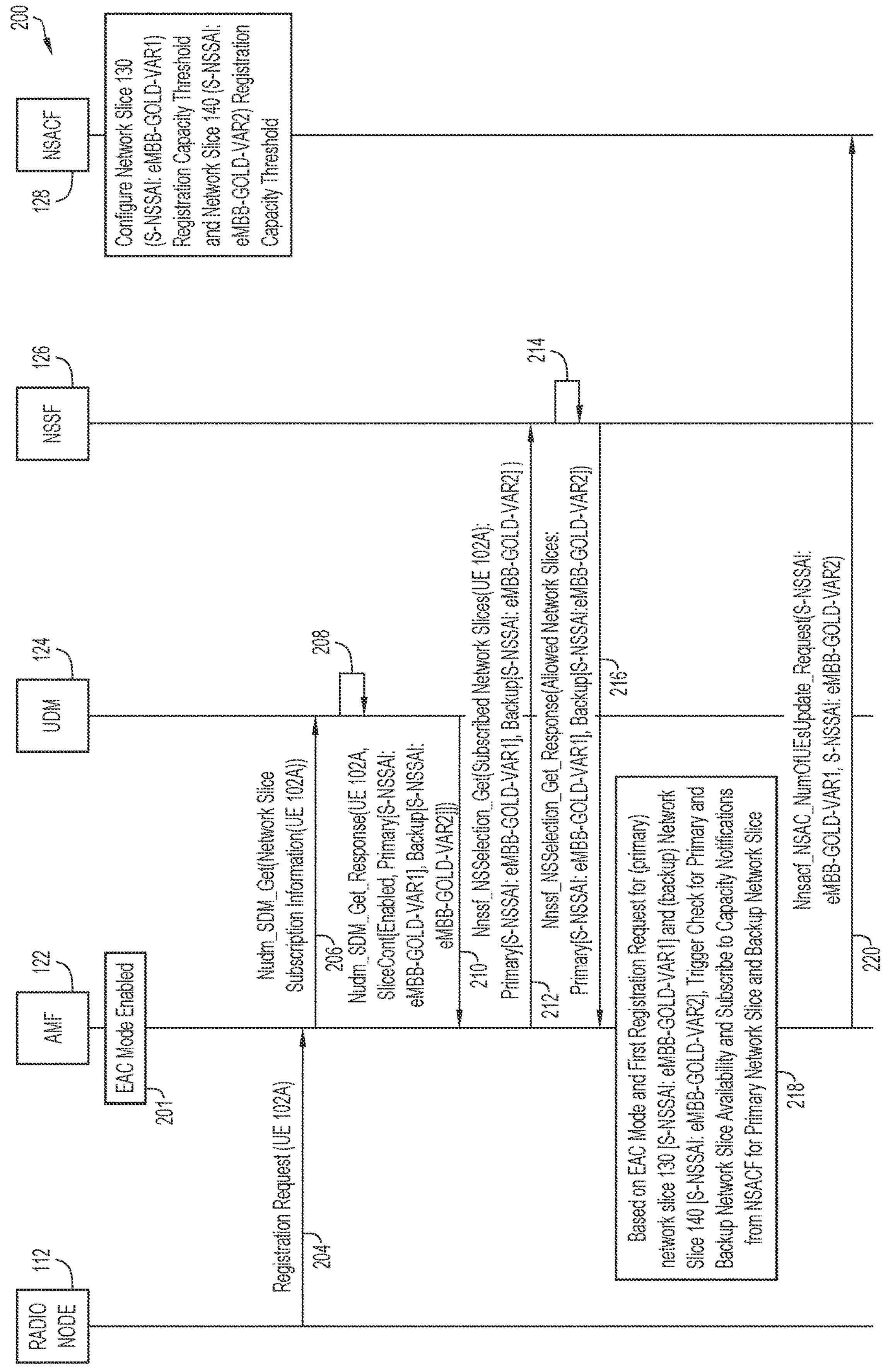
FIGS. 2A, 2B, 2C, and 2D are a message sequence diagram illustrating various example operations that may be performed to facilitate network slice service continuity for a mobile network environment, according to an example embodiment.

Consider example registration operations for UE 102A that seeks to register with mobile core network 120 in which a registration request involving UE 102A is sent by UE 102A to radio node 112, which sends the registration request to AMF 122, as shown at 204 of FIG. 2A. In at least one embodiment, the registration request can include a Subscription Permanent Identifier (SUPI) and/or an International Mobile Subscriber Identity (IMSI) that uniquely identifies UE 102A/the user/subscriber associated therewith, which can be used to identify/obtain subscription information for the UE 102A via UDM 124 (e.g., as configured via subscription data 125, as shown in FIG. 1).

For example, as shown at 206, AMF 122 initiates a query toward UDM 124 to obtain subscription information for UE 102A identifying the network slices to which the UE 102A is subscribed. The query towards UDM 124 can be sent as a 'Nudm_SDM_Get' (Subscriber Data Management (SDM)) message sent by AMF 122 including the SUPI/IMSI for UE 102A.

As shown at 208, the UDM 124 can perform a look up on the subscription data 125 to locate the subscription information for UE 102A using the SUPI/IMSI for the UE 102A included in the received query/request. Upon identifying the subscription information for UE 102A at 208 (based on the SUPI/IMSI for UE 102A), the UDM 124 can transmit a response to AMF 122 that includes subscription information for UE 102A identifying the primary and backup (secondary) network slices to which UE 102A is subscribed, as shown at 210 (e.g., indicating that network slice service continuity is enabled for UE 102A).

The response obtained by the AMF 122 at 210 may be a 'Nudm_SDM_Get_Response' message sent by the UDM 124 to the AMF 122 in response to the 'Nudm_SDM_Get' query regarding UE 102A sent at 206.

As shown at 210, the response obtained by the AMF 122 can identify the primary network slice(s), such as 'S-NSSAI: eMBB-GOLD-VAR1' identifying network slice 130 to which the UE 102A is subscribed, and also the corresponding backup network slice(s), such as 'S-NSSAI: eMBB-GOLD-VAR2' identifying network slice 140 to which UE 102A is subscribed. It is to be understood that, in some embodiments, the subscription information for a UE can identify a plurality of primary network slices and a plurality of corresponding backup network slices for each of a plurality of slice types to which the UE is subscribed. Although not shown in FIG. 2A, at least one default network slice can be identified in the subscription information for UE 102A, which is typically a general service network slice that may serve the UE.

In accordance with embodiments herein, the 'Nudm_SDM_Get_Response' message sent by the UDM 124 to AMF 122 at 210 can include an enhanced Network Slice Selection Assistance Information (NSSAI) data type in which the primary network slice(s) to which the UE 102A is subscribed can be identified and a new data element or information element (IE) can further be included to identify the backup network slice(s) to which UE 102A is subscribed.

For example, with reference to FIG. 3A, FIG. 3A is a schematic diagram illustrating an enhanced 'NSSAI' data type 300 that can be included in a 'Nudm_SDM_Get_Response' message sent to AMF 122 that can be used to identify one or more one or more primary network slices to which a UE (e.g., UE 102A) is subscribed and one or more backup network slices to which the UE is subscribed. As shown in FIG. 3A, the primary network slice(s) to which a UE (e.g., UE 102A) is subscribed can be identified in a 'singleNssais' data element 302 in which the S-NSSAI(s) of the primary network slices to which the UE is subscribed can be identified in an array for the corresponding list of non-default (primary) single NSSAI(s) (S-NSSAI(s)) provided for the 'singleNssais' data element 302. The 'singleNssais' data element 302 can generally be configured as prescribed per 3GPP Technical Specification (TS) 29.503; however, in accordance with embodiments herein, the 'singleNssais' data element 302 can be utilized to carry/identify the primary network slice(s) to which a UE is subscribed.

In accordance with embodiments herein, the enhanced 'NSSAI' data type 300 that can be included in a 'Nudm_SDM_Get_Response' can be augmented to include a 'BackupsingleNssais' data element 304 in which the S-NSSAI(s) of the backup network slice(s) to which a UE is subscribed can be identified in an array for the corresponding list of non-default (backup) single NSSAI(s) (S-NSSAI(s)) provided for the 'BackupsingleNssais' data element 304.

Thus, in at least one embodiment for the example illustrated in FIG. 2A, the 'Nudm_SDM_Get_Response' obtained by the AMF 122 at 210 can identify the primary network slice 'S-NSSAI: eMBB-GOLD-VAR1' (network slice 130) to which the UE 102A is subscribed via the 'singleNssais' data element 302 included in the enhanced 'NSSAI' data type 300 for the message and can identify the backup network slice 'S-NSSAI: eMBB-GOLD-VAR2' (network slice 140) to which the UE 102A is subscribed via the 'BackupsingleNssais' data element 304 included in the enhanced 'NSSAI' data type 300 for the message. It is to be understood that the 'Nudm_SDM_Get_Response' can include any other information, parameters, etc. as may be prescribed per 3GPP TS 29.503.

Continuing with the present example, as shown at 212, the AMF 122 initiates a query towards NSSF 126 in order to obtain registration information for UE 102A identifying the primary and backup network slice(s) with which the UE 102A is allowed registration. The query towards NSSF 126 can be sent at 212 by the AMF 122 as a 'Nnssf_NSSelection_Get' (Network Slice Selection (NSSelection)) message that may include the SUPI/IMSI of UE 102A, the lists of primary and backup network slices to which UE 102A is subscribed (e.g., identifying both of primary network slice 'S-NSSAI: eMBB-GOLD-VAR1' (network slice 130) and backup network slice 'S-NSSAI: eMBB-GOLD-VAR2' (network slice 140)), along with various other information/parameters, such as a location of UE 102A, network conditions of (R) AN 110 and/or mobile core network 120, combinations thereof, and/or the like as may be prescribed per 3 GPP standards, etc. that may be utilized by the NSSF 126 to determine whether UE 102A is allowed registration with the subscribed primary and backup network slices.

In various embodiments, the location of UE 102A can be identified via a Tracking Area Identity (TAI), a Routing Area Identification (RAI), a Routing Area Code (RAC), a Public Land Mobile Network (PLMN) identifier (PLMN-ID), and/or any other location-related information that may be associated with a coverage area/area of service of (R)AN 110 and/or mobile core network 120 that may be utilized by NSSF 126 in order to determine whether the UE 102A is allowed to perform registration with the primary network slice 'S-NSSAI: eMBB-GOLD-VAR1' (network slice 130) and the backup network slice 'S-NSSAI: eMBB-GOLD-VAR2' (network slice 140) to which the UE 102A is subscribed.

In accordance with embodiments herein, the 'Nnssf_NSSelection_Get' message sent by the AMF 122 to the NSSF 126 at 212 can include an enhanced 'SliceInfoForRegistration' data type in which the primary network slice(s) to which the UE 102A is subscribed can be identified and a new data element or IE can further be included to identify the backup network slice(s) to which UE 102A is subscribed, which can trigger the NSSF 126 to determine/select whether the UE 102A is allowed registration with both the primary and backup network slice(s).

For example, with reference to FIG. 3B, FIG. 3B is a schematic diagram illustrating an enhanced 'SliceInfoForRegistration' data type 320 that can be included in a 'Nnssf_NSSelection_Get' message sent from AMF 122 to NSSF 126 that can be used to identify one or more primary network slices to which a UE (e.g., UE 102A) is subscribed and to identify one or backup network slices to which the UE is subscribed. As shown in FIG. 3B, the primary network slice(s) to which a UE (e.g., UE 102A) is subscribed can be identified in a 'subscribedNssai' IE 322 in which the S-NSSAI(s) of the primary network slice(s) to which the UE is subscribed can be identified in an array for the corresponding list of (primary) subscribed S-NSSAI(s) for the 'subscribedNssai' IE 322. The 'subscribedNssai' IE 322 can generally be configured as prescribed per 3GPP TS 29.531; however, in accordance with embodiments herein, the 'subscribedNssai' IE 322 can be utilized to carry/identify the primary network slice(s) to which a UE is subscribed.

In accordance with embodiments herein, the enhanced 'SliceInfoForRegistration' data type 320 can be augmented to include a 'BackupsubscribedNssai' IE 324 in which the S-NSSAI(s) of the backup network slice(s) to which a UE is subscribed can be identified in an array for the corresponding list of backup network slice S-NSSAI(s) provided for the 'BackupsubscribedNssai' IE 324.

Thus, in at least one embodiment for the example illustrated in FIG. 2A, the 'Nnssf_NSSelection_Get' message sent by the AMF 122 at 212 can identify the primary network slice 'S-NSSAI: eMBB-GOLD-VAR1' (network slice 130) to which UE 102A is subscribed via the 'subscribedNssai' IE 322 included in the enhanced 'SliceInfoForRegistration' data type 320 and can identify the backup network slice 'S-NSSAI: eMBB-GOLD-VAR2' (network slice 140) to which UE 102A is subscribed via the 'BackupsubscribedNssai' IE 324 included in the enhanced 'SliceInfoForRegistration' data type 320. It is to be understood that the enhanced 'SliceInfoForRegistration' data type 320 can include any other information, parameters, etc. as may be prescribed by 3GPP TS 29.531, such as the location of UE 102A, network condition information, etc. that may be NSSF 126 to perform an authorization decision regarding whether UE 102A is allowed registration with the primary and backup network slices.

Continuing with the present example, consider at 214 that, based on the location information for UE 102A, etc., the NSSF 126 determines that UE 102A is authorized/allowed registration with both of the primary network slice 'S-NSSAI: eMBB-GOLD-VAR1' (network slice 130) and the backup network slice 'S-NSSAI: eMBB-GOLD-VAR2' (network slice 140), which triggers the NSSF 126 to generate and send a response to AMF 122 at 216 that includes registration information for UE 102A identifying that UE 102A is allowed registration with both of the primary and backup network slices.

The response obtained by the AMF 122 at 216 may be a 'Nnssf_NSSelection_Get_Response' message sent by the NSSF 126 in response to the 'Nnssf_NSSelection_Get' query regarding UE 102A sent at 212.

As shown at 216, the response obtained by the AMF 122 can identify the primary network slice(s) with which UE 102A is allowed registration, such as 'S-NSSAI: eMBB-GOLD-VAR1' identifying network slice 130 and can identify the backup network slice(s) with which UE 102A is allowed registration, such as 'S-NSSAI: eMBB-GOLD-VAR2' identifying network slice 140. It is to be understood that, in some embodiments, registration information for a UE can identify a plurality of primary network slices (e.g., via corresponding primary and backup lists) and a plurality of corresponding backup network slices for each of a plurality of slice types with which the UE is allowed registration.

In accordance with embodiments herein, the 'Nnssf_NSSelection_Get_Response' message sent by the NSSF 126 at 216 can include an enhanced 'AuthorizedNetworkSliceInfo' data type in which the primary network slice(s) with which the UE 102A is allowed registration can be identified and a new data element or IE can further be included to identify the backup network slice(s) with which the UE 102A is allowed registration.

For example, with reference to FIG. 3C, FIG. 3C is a schematic diagram illustrating an enhanced 'AuthorizedNetworkSliceInfo' data type 340 that can be included in a "Nnssf_NSSelection_Get_Response' message sent by the NSSF 126 to AMF 122 that can be used to identify one or more primary network slices to which a UE (e.g., UE 102A) is authorized registration and to identify one or more backup network slices to which the UE is authorized registration. As shown in FIG. 3C, the primary network slice(s) to which a UE (e.g., UE 102A) is authorized registration can be identified in an 'allowedNssaiList' IE 342 in which the S-NSSAI(s) of the primary network slice(s) with which registration is allowed or authorized can be identified in an array for the corresponding list of allowed (primary) S-NSSAI(s) for the 'allowedNssaiList' IE 342. The 'allowedNssaiList' IE 342 can generally be configured as prescribed per 3GPP TS 29.531; however, in accordance with embodiments herein, the 'allowedNssaiList' IE 342 can be utilized to carry/identify the primary network slice(s) with which the UE is allowed registration.

In accordance with embodiments herein, the enhanced 'AuthorizedNetworkSliceInfo' data type 340 can be augmented to include a 'BackupallowedNssaiList' IE 344 in which the S-NSSAI(s) of the backup network slice(s) with which the UE is allowed registration can be identified in an array for the corresponding list of backup network slice S-NSSAI(s) provided for the 'BackupallowedNssaiList' IE 344.

Thus, in at least one embodiment for the example illustrated in FIG. 2A, the 'Nnssf_NSSelection_Get_Response' message sent by the NSSF 126 and obtained by the AMF 122, as shown at 216, can include registration information for UE 102A identifying the primary network slice 'S-NSSAI: eMBB-GOLD-VAR1' (network slice 130) with which UE 102A is allowed registration via the 'allowedNssaiList' IE 342 included in the enhanced 'AuthorizedNetworkSliceInfo' data type 340 and can identify the backup network slice 'S-NSSAI: eMBB-GOLD-VAR2' (network slice 140) with which UE 102A is allowed registration via the 'BackupallowedNssaiList' IE 344 included in the enhanced 'AuthorizedNetworkSliceInfo' data type 340. It is to be understood that the enhanced 'AuthorizedNetworkSliceInfo' data type 340 can include any other information, parameters, etc. as may be prescribed by 3GPP TS 29.531.

Continuing with the present example, in order to facilitate network slice service continuity in accordance with embodiments herein, upon obtaining the registration information for UE 102A identifying each of the primary and backup network slices with which UE 102A is allowed registration, the AMF 122 can perform a query towards NSACF 128, as shown at 220, to determine whether there is registration capacity/availability with regard to the primary network slice 'S-NSSAI: eMBB-GOLD-VAR1' (network slice 130) and the backup network slice 'S-NSSAI: eMBB-GOLD-VAR2' (network slice 140) for the registration involving UE 102A.

In at least one embodiment as generally shown at 218, based on the EAC mode being enabled for the AMF 122 and the registration request for UE 102A being a first registration request involving the (primary) network slice 130 [S-NSSAI: eMBB-GOLD-VAR1] and the (backup) network slice 140 [S-NSSAI: eMBB-GOLD-VAR2], an availability check and update procedure is triggered for the AMF 122 in which the AMF 122 is to query the NSACF 128 in order to determine whether there is registration capacity for registration of UE 102A with the primary network slice and the backup network slice with which UE 102A is allowed registration. The query performed by the AMF 122 involving the primary network slice ('S-NSSAI: eMBB-GOLD-VAR1' (network slice 130)) can also be used to implicitly subscribe the AMF 122 to receive EAC notification(s) regarding the primary network slice; for example, when the capacity threshold for network slice 130 may be met and/or when there capacity may become available for the network slice.

Further, the query performed by the AMF 122 involving the backup network slice ('S-NSSAI: eMBB-GOLD-VAR2'

(network slice 140)) can also be used to implicitly subscribe the AMF 122 to receive EAC notification(s) regarding the backup network slice; for example, when the capacity threshold for network slice 140 may be met and/or when capacity may become available for the network slice.

In order to perform the availability query and subscribe to notifications involving network slice 130 and network slice 140, the AMF 122, as shown at 220, can send a 'Nnsacf_NSAC_NumOfUEsUpdate_Request' message to NSACF 128 identifying the (primary) network slice 130, 'S-NSSAI: eMBB-GOLD-VAR1' and identifying the (backup) network slice 140 'S-NSSAI: eMBB-GOLD-VAR2'.

Figure 2B:
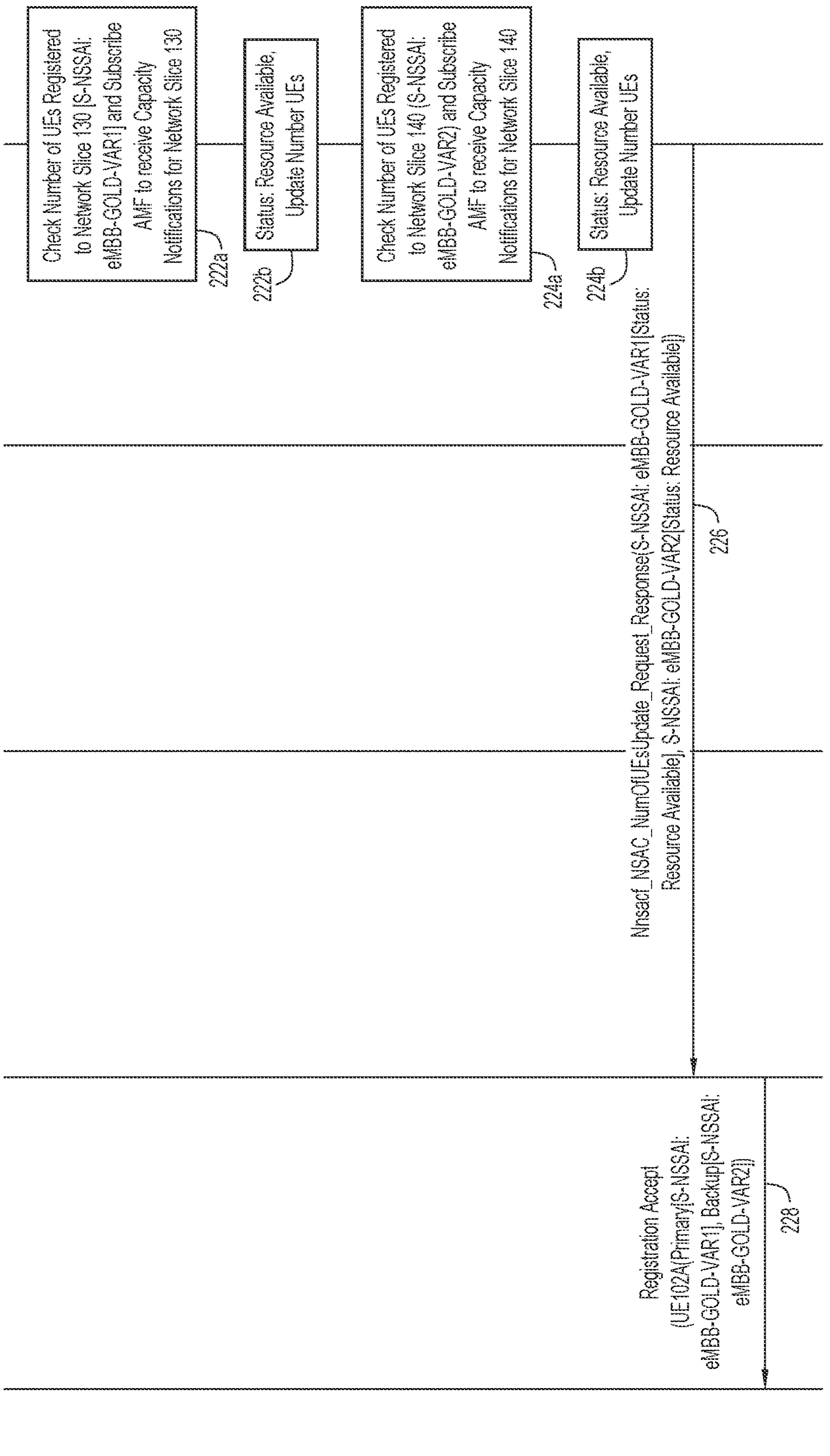

Continuing to FIG. 2B, as generally shown at 222*a*, the NSACF 128 can check the number of UEs registered to the (primary) network slice 130 to determine whether registration of UE 102A for the (primary) network slice 130 would cause the registration capacity threshold for the network slice to be exceeded and the NSACF 128 can initiate a subscription for AMF 122 regarding subscribing to registration capacity notifications involving the network slice 130. As shown at 222*b*, upon determining that there is registration capacity available (e.g., 'Status: Resource Available') for registration of UE 102A with the (primary) network slice 130 (e.g., registration is allowed for UE 102A for the primary network slice), the NSACF 128 can update the number of UEs registered to the network slice 130.

As generally shown at 224*a*, the NSACF 128 can check the number of UEs registered to the (backup) network slice 140 to determine whether registration of UE 102A for the (backup) network slice 140 would cause the registration capacity threshold to be exceeded and the NSACF 128 can initiate a subscription for AMF 122 regarding subscribing to registration capacity notifications involving the network slice 140. As shown at 224*b*, upon determining that there is registration capacity available (e.g., 'Status: Resource Available') for registration of UE 102A with the (backup) network slice 140 (e.g., registration is allowed for UE 102A for the backup network slice), the NSACF 128 can update the number of UEs registered to the network slice 140.

Thereafter, upon successful determination that registration capacity is available for registration of UE 102A with each of the (primary) network slice 130 and the (backup) network slice 140 and updating the number of UEs registered with each network slice, the NSACF 128 communicates a 'Nnsacf_NSAC_NumberOfUEsUpdate_Response' message to AMF 122, as shown at 226, indicating registration capacity is available with regard to each of the (primary) network slice 130 (e.g., 'Status: Resource Available') and the (backup) network slice 140 (e.g., 'Status: Resource Available') for UE 102A.

Upon determining, based on the message obtained from NSACF 128, that there is registration capacity available with regard to each of the (primary) network slice 130 and the (backup) network slice 140 for UE 102A, the AMF 122 completes the registration of UE 102A with the network slice 130 and the network slice 140 and sends a registration accept message to UE 102A, via radio node 112, as shown at 228 that identifies, among other information, that registration with each of the each of the (primary) network slice 130 [S-NSSAI: eMBB-GOLD-VAR1] and the (backup) network slice 140 [S-NSSAI: eMBB-GOLD-VAR2] is accepted.

The UE 102A (and any other UEs discussed for embodiments herein) can maintain a mapping between primary and backup network slices that provide the same network services (e.g., a mapping indicating that both (primary) S-NSSAI: eMBB-GOLD-VAR-1 and (backup) S-NSSAI: eMBB-GOLD-VAR2 provide the same network services), such that the UE 102A can automatically perform PDU session establishment with either network slice depending on different scenarios (e.g., PDU session establishment is rejected for the primary network slice (instance), which can trigger the UE to automatically attempt PDU session establishment with the backup network slice (instance); UE moves out of coverage of a primary network slice (instance) providing particular network service(s) and automatically establishes a PDU session with the backup network slice (instance) providing the same network service(s), etc.).

In at least one embodiment, a registration accept message, as defined at 3GPP TS 24.501, Section 8.2.7, can be updated to include a list of backup allowed NSSAIs to identify the backup allowed S-NSSAIs for which a UE registration is accepted, in addition to the list of (primary) allowed NSSAIs that can be sent to the UE. For example, a new 'backup allowed NSSAI' data element can be configured for/carried in a registration accept message sent to a UE to identify the backup allowed S-NSSAIs for which the UE registration is accepted. The 'allowed NSSAI' data element for the registration accept message can generally be configured as prescribed per 3GPP TS 24.501; however, in accordance with embodiments herein, the 'allowed NSSAI' data element can be utilized to carry/identify the primary network slice(s) for which registration is accepted for a UE.

Thereafter, although not shown in FIGS. 2A, 2B, 2C, and 2D, the UE 102A can use the (primary) network slice 130 to initiate PDU session creation in at least one embodiment. During the PDU session creation, an SMF (not shown) of the network slice 130 can perform another availability check with the NSACF 128 to determine whether a session capacity threshold has been met for the network slice 130 (e.g., whether there is session capacity available for the UE 102A). At that time, if the session capacity threshold for the network slice 130 has been met/satisfied or if the network slice 130 happens to be down (e.g., for maintenance, etc.), the NSACF 128 may rejection PDU session creation for the UE 102A. However, in accordance with embodiments herein, since the UE 102A received an indication of both the (primary) network slice 130 and the (backup) network slice 140 in the allowed list of network slices via the registration accept sent at 228, the UE 102A can automatically select the (backup) network slice 140 with which to establish the PDU session without again having to perform another network slice registration procedure with the mobile core network 120 specifically for the (backup) network slice 140. Thus, embodiments herein may facilitate slice service continuity in a manner that can reduce PDU session establishment time for cases in which a first network slice (e.g., primary) of a given slice type with which the UE is registered is not available for PDU session establishment (e.g., overloaded or down) such that a UE can automatically select a second network slice (e.g., backup) of the given slice type with which the UE is already registered.

Figure 2C:
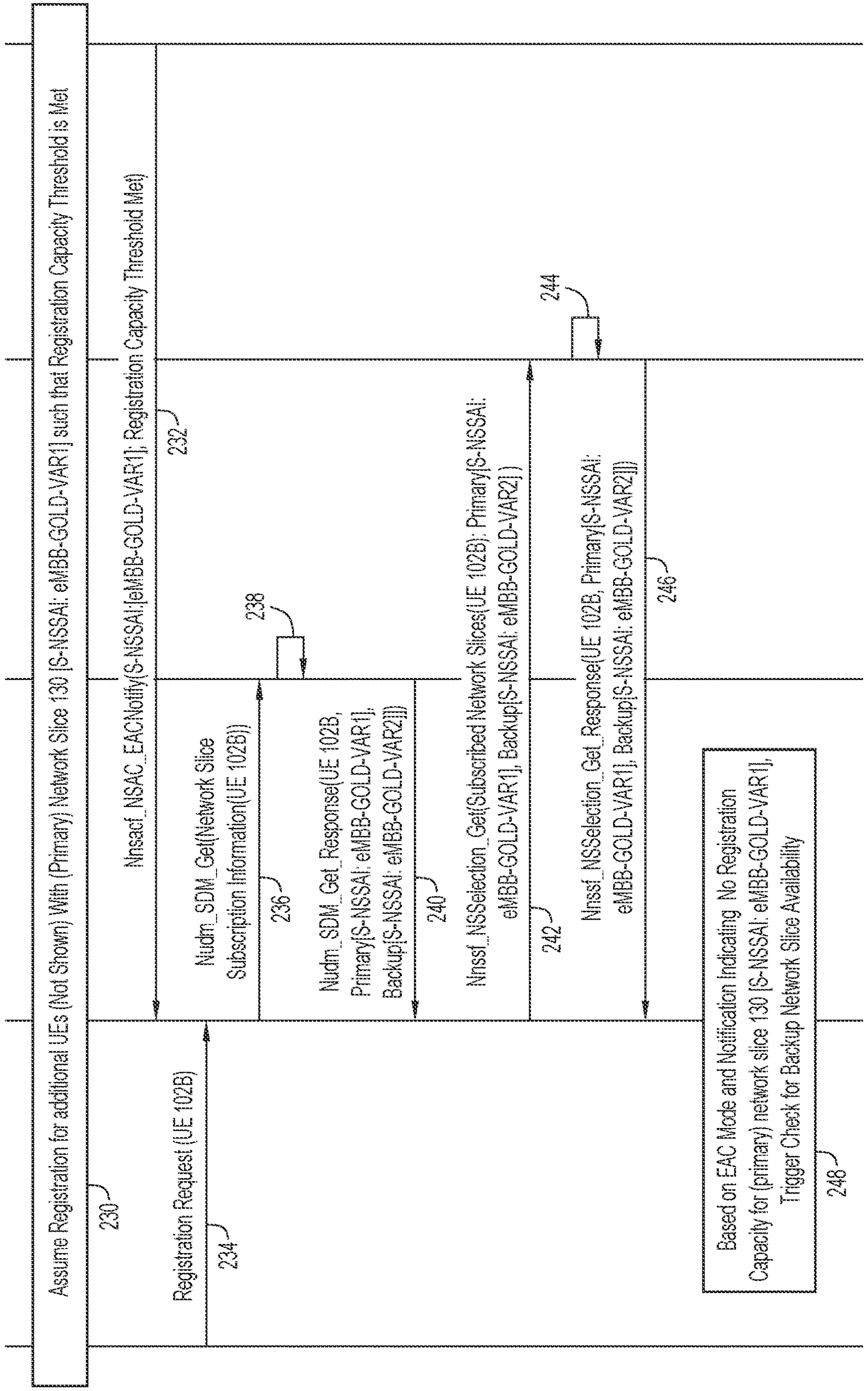

As noted above, for the example of FIGS. 2A, 2B, 2C, and 2D, the AMF 122 can subscribe to EAC notifications involving each of network slice 130 (e.g., at 222*a*) and network slice 140 (e.g., at 224*b*). In one illustrative example, as shown in FIG. 2C, consider at 230 that a number of other UEs (not shown) register with network slice 130, which triggers the registration capacity threshold for the network slice 130 to be met.

Based on the registration capacity threshold for network slice 130 being met, the NSACF 128 sends a notification to AMF 122 indicating that the registration capacity threshold for network slice 130 [S-NSSAI: eMBB-GOLD-VAR1] is met/reached (e.g., an overload condition is triggered for the network slice 130), as shown at 232. In at least one embodiment, the notification sent to AMF 122 at 232 is a 'Nnsacf_NSAC_EACNotify' message including the S-NSSAI: eMBB-GOLD-VAR1 identifying network slice 130 and an indication that the registration capacity threshold for the network slice 130 is met and/or an overload condition is triggered.

Thereafter, as shown at 234, consider that UE 102B that seeks to register with mobile core network 120 in which a registration request involving UE 102B is sent by UE 102B to radio node 112, which sends the registration request to AMF 122, as shown at 234. As shown at 236, AMF 122 initiates a query toward UDM 124 to obtain subscription information for UE 102B identifying the network slices to which the UE 102B is subscribed. The query towards UDM 124 can be sent as a 'Nudm_SDM_Get' message sent by AMF 122 including the SUPI/IMSI for UE 102B.

As shown at 238, the UDM 124 can perform a look up on the subscription data 125 to locate the subscription information for UE 102B using the SUPI/IMSI for the UE 102B included in the received query/request. Upon identifying the subscription information for UE 102B at 208 (based on the SUPI/IMSI for UE 102B), the UDM 124 can transmit a response to AMF 122 that includes subscription information for UE 102B identifying the primary and backup network slices to which UE 102B is subscribed, as shown at 240 (e.g., indicating that network slice service continuity is enabled for UE 102B).

The response obtained by the AMF 122 at 240 may be a 'Nudm_SDM_Get_Response' message sent by the UDM 124 to the AMF 122 in response to the 'Nudm_SDM_Get' query regarding UE 102A sent at 236.

As shown at 240, the response obtained by the AMF 122 can identify the primary network slice(s), such as 'S-NSSAI: eMBB-GOLD-VAR1' identifying network slice 130 to which the UE 102B is subscribed, and also the corresponding backup network slice(s), such as 'S-NSSAI: eMBB-GOLD-VAR2' identifying network slice 140 to which UE 102B is subscribed. It is to be understood that, in some embodiments, the subscription information for a UE can identify a plurality of primary network slices and a plurality of corresponding backup network slices for each of a plurality of slice types to which the UE is subscribed. Although not shown in FIG. 2C, at least one default network slice can be identified in the subscription information for UE 102B, which is typically a general service network slice that may serve the UE.

In at least one embodiment for the example illustrated in FIG. 2C, the 'Nudm_SDM_Get_Response' obtained by the AMF 122 at 240 can identify the primary network slice 'S-NSSAI: eMBB-GOLD-VAR1' (network slice 130) to which the UE 102B is subscribed via the 'singleNssais' data element 302 included in the enhanced 'NSSAI' data type 300 (as shown in FIG. 3A) for the message and can identify the backup network slice 'S-NSSAI: eMBB-GOLD-VAR2' (network slice 140) to which the UE 102B is subscribed via the 'BackupsingleNssais' data element 304 included in the enhanced 'NSSAI' data type 300 for the message. It is to be understood that the 'Nudm_SDM_Get_Response' can include any other information, parameters, etc. as may be prescribed per 3GPP TS 29.503.

As shown at 242, the AMF 122 initiates a query towards NSSF 126 in order to obtain registration information for UE 102B identifying the primary and backup network slice(s) with which the UE 102B is allowed registration. The query towards NSSF 126 can be sent at 242 by the AMF 122 as a 'Nnssf_NSSelection_Get' message that may include the SUPI/IMSI of UE 102B, the lists of primary and backup network slices to which UE 102B is subscribed (e.g., identifying both of primary network slice 'S-NSSAI: eMBB-GOLD-VAR1' (network slice 130) and backup network slice 'S-NSSAI: eMBB-GOLD-VAR2' (network slice 140)), along with various other information/parameters, such as a location of UE 102B, network conditions of (R)AN 110 and/or mobile core network 120, combinations thereof, and/or the like as may be prescribed per 3GPP standards, etc. that may be utilized by the NSSF 126 to determine whether UE 102B is allowed registration with the subscribed primary and backup network slices In at least one embodiment for the example illustrated in FIG. 2C, the 'Nnssf_NSSelection_Get' message sent by the AMF 122 at 242 can identify the primary network slice 'S-NSSAI: eMBB-GOLD-VAR1' (network slice 130) to which UE 102B is subscribed via the 'subscribedNssai' IE 322 included in the enhanced 'SliceInfoForRegistration' data type 320 (as shown in FIG. 3C) and can identify the backup network slice 'S-NSSAI: eMBB-GOLD-VAR2' (network slice 140) to which UE 102B is subscribed via the 'BackupsubscribedNssai' IE 324 included in the enhanced 'SliceInfoForRegistration' data type 320. It is to be understood that the enhanced 'SliceInfoForRegistration' data type 320 can include any other information, parameters, etc. as may be prescribed by 3GPP TS 29.531, such as the location of UE 102B, network condition information, etc. that may be NSSF 126 to perform an authorization decision regarding whether UE 102B is allowed registration with the primary and backup network slices.

Consider at 244 that, based on the location information for UE 102B, etc., the NSSF 126 determines that UE 102B is authorized/allowed registration with both of the primary network slice 'S-NSSAI: eMBB-GOLD-VAR1' (network slice 130) and the backup network slice 'S-NSSAI: eMBB-GOLD-VAR2' (network slice 140), which triggers the NSSF 126 to generate and send a response to AMF 122 at 246 that includes registration information for UE 102B identifying that UE 102B is allowed registration with both of the primary and backup network slices.

The response obtained by the AMF 122 at 246 may be a 'Nnssf_NSSelection_Get_Response' message sent by the NSSF 126 in response to the 'Nnssf_NSSelection_Get' query regarding UE 102B sent at 242.

In at least one embodiment for the example illustrated in FIG. 2C, the 'Nnssf_NSSelection_Get_Response' message sent by the NSSF 126 and obtained by the AMF 122, as shown at 246, can include registration information for UE 102B identifying the primary network slice 'S-NSSAI: eMBB-GOLD-VAR1' (network slice 130) with which UE 102B is allowed registration via the 'allowedNssaiList' IE 342 included in the enhanced 'AuthorizedNetworkSliceInfo' data type 340 (as shown in FIG. 3C) can identify the backup network slice 'S-NSSAI: eMBB-GOLD-VAR2' (network slice 140) with which UE 102B is allowed registration via the 'BackupallowedNssaiList' IE 344 included in the enhanced 'AuthorizedNetworkSliceInfo' data type 340. It is to be understood that the enhanced 'AuthorizedNetworkSliceInfo' data type 340 can include any other information, parameters, etc. as may be prescribed by 3GPP TS 29.531.

Receiving the registration capacity threshold notification for network slice 130, as shown at 232 (via the 'Nnsacf_NSAC_EACNotify' message), can trigger the AMF 122 to exclude the network slice 130 from registration capacity checks for subsequent UEs that may be subscribed to network slice 130 and allowed registration by the NSSF 126, such as UE 102B, until a later time if/when the AMF 122 may be notified that there is registration capacity available for the network slice 130.

For example, as shown in FIG. 2C, consider as generally shown at 248 that, based on the EAC mode being enabled for AMF 122 and receipt of the previous notification (230) indicating that there is no registration capacity available for (primary) network slice 130 [S-NSSAI: eMBB-GOLD-VAR1] with which UE 102B is both subscribed and allowed registration (by NSSF 126), the AMF determines that an availability check and update procedure for the network slice 130 is not to be performed. Thus, AMF 122 decides not to choose the (primary) network slice 130 for the availability check and update procedure and instead decides that an availability check and update procedure are only to be performed for the (backup) network slice 140 [S-NSSAI: eMBB-GOLD-VAR1] to which UE 102B is also subscribed and allowed registration, since the AMF 122 has not received a notification indicating that the capacity threshold for the (backup) network slice 140.

Figure 2D:
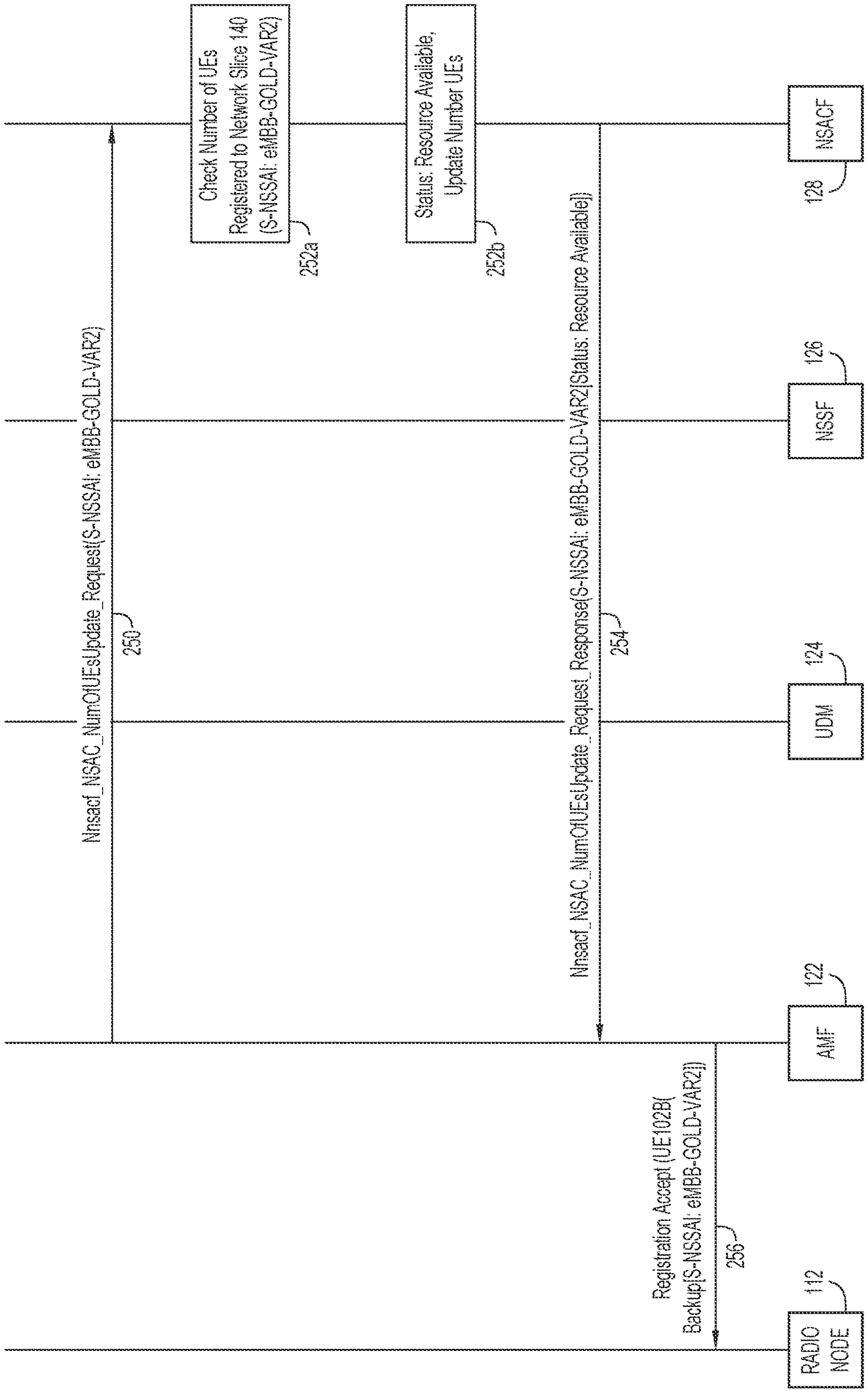

Based on the determination at 248, the AMF 122 therefore triggers an availability check and update procedure involving (backup) network slice 140, as shown at 250 of FIG. 2D, in which the AMF 122 queries the NSACF 128 in order to determine whether there is registration capacity for registration of UE 102B the backup network slice with which UE 102B is allowed registration.

As generally shown at 252*a*, the NSACF 128 can check the number of UEs registered to the (backup) network slice 140 to determine whether registration of UE 102B for the (backup) network slice 140 would cause the registration capacity threshold to be exceeded. Due to the previous availability check and update procedure being performed by the AMF with regard to registration of UE 102A involving the (backup) network slice 140, as discussed above at 220, the query at 248 involving registration of UE 102B with the (backup) network slice 140 may not trigger a new subscription to EAC notifications involving the (backup) network slice 140 for AMF 122.

As shown at 252*b*, upon determining that there is registration capacity available for registration of UE 102B with the (backup) network slice 140 (e.g., registration is allowed for UE 102B for the backup network slice), the NSACF 128 can update the number of UEs registered to the network slice 140.

Thereafter, upon successful determination that registration capacity is available for registration of UE 102B with the (backup) network slice 140 and performing the number of UEs update, the NSACF 128 communicates a 'Nnsacf_NSAC_NumberOfUEsUpdate_Response' message to AMF 122, as shown at 254, indicating registration capacity is available with regard to the (backup) network slice 140 for UE 102B.

Upon determining, based on the message obtained from NSACF 128, that there is registration capacity available with regard to the (backup) network slice 140 for UE 102B, the AMF 122 completes the registration of UE 102B with the network slice 140 and sends a registration accept message to UE 102B, via radio node 112, as shown at 256 that identifies, among other information, that registration with the (backup) network slice 140 [S-NSSAI: eMBB-GOLD-VAR2] is accepted. Since there is no available registration capacity for network slice 130 at the time of the registration request involving UE 102B, the registration accept message sent to the UE 102B does not identify the (primary) network slice 130 in the message.

The AMF 122 can continue in this manner regarding availability check and update procedure involving only the network slice 140 until it receives a further notification from NSACF 128 suggesting/indicating that the network slice 130 is no longer overloaded (e.g., due to a number of UEs de-registering from the network slice 130, moving out of the coverage area for the network slice 130 and being de-registered from the network slice 130, etc.).

Although the example illustrated in FIG. 2C involves a scenario in which a network slice has become overloaded, it is to be understood that similar operations may be performed for a scenario in which a network slice is down due to maintenance, etc. In such a scenario, either the NSACF 128 or other network entity may notify the AMF 122 regarding the unavailability of the down network slice (e.g., via an EAC notification) and/or an availability check and update procedure query involving the network slice may fail with the NSACF 128 or the NSACF 128 may respond with an unavailability indication in response to the query. In such a scenario, the AMF 122 can exclude the network slice from subsequent availability checks until such a time that the AMF 122 receives an indication/notification that the network slice is again available for UE registration.

Thus, system 100 may facilitate network slice service continuity in 5GaaS deployments in accordance with embodiments herein. The slice continuity features as provided herein can be provided subscription-based features that may be available to some UEs but not available for other UEs.

Embodiments herein may be extended to cover scenarios in which different MNOs and/or slice providers may provide different combinations of network slices that can be identified as primary and backup network slices for different sets/groups of UEs. For example, in some scenarios, a set of UEs may be subscribed to a network slice 'S-NSSAI: eMBB-GOLD-PROVIDER1' as a primary network slice and a network slice 'S-NSSAI: eMBB-GOLD-PROVIDER2' as a backup network slice in which each primary and backup network slice (instance) provide the same network services by different providers. In such a scenario, when the eMBB-GOLD-PROVIDER 1 is network slice unavailable/overloaded (all potential instances of the network slice) a UE can then start using eMBB-GOLD-PROVIDER2 for the network service. Other scenarios can be envisioned based on PLMN-ID network slice segmentation, slice coverage area (e.g., a list of routing areas), and/or the like. In some instances, embodiments as provided via system 100 may be applicable to 5GaaS multi-tenant scenarios in which a same slice type, with different S-NSSAI values, can be used to serve different tenants.

Further, embodiments herein can be implemented without affecting UE Route Selection Policy (URSP) procedures or data, as the allowed list of primary and/or backup network slices can be provided to UEs via registration accept messaging.

Figure 4A:
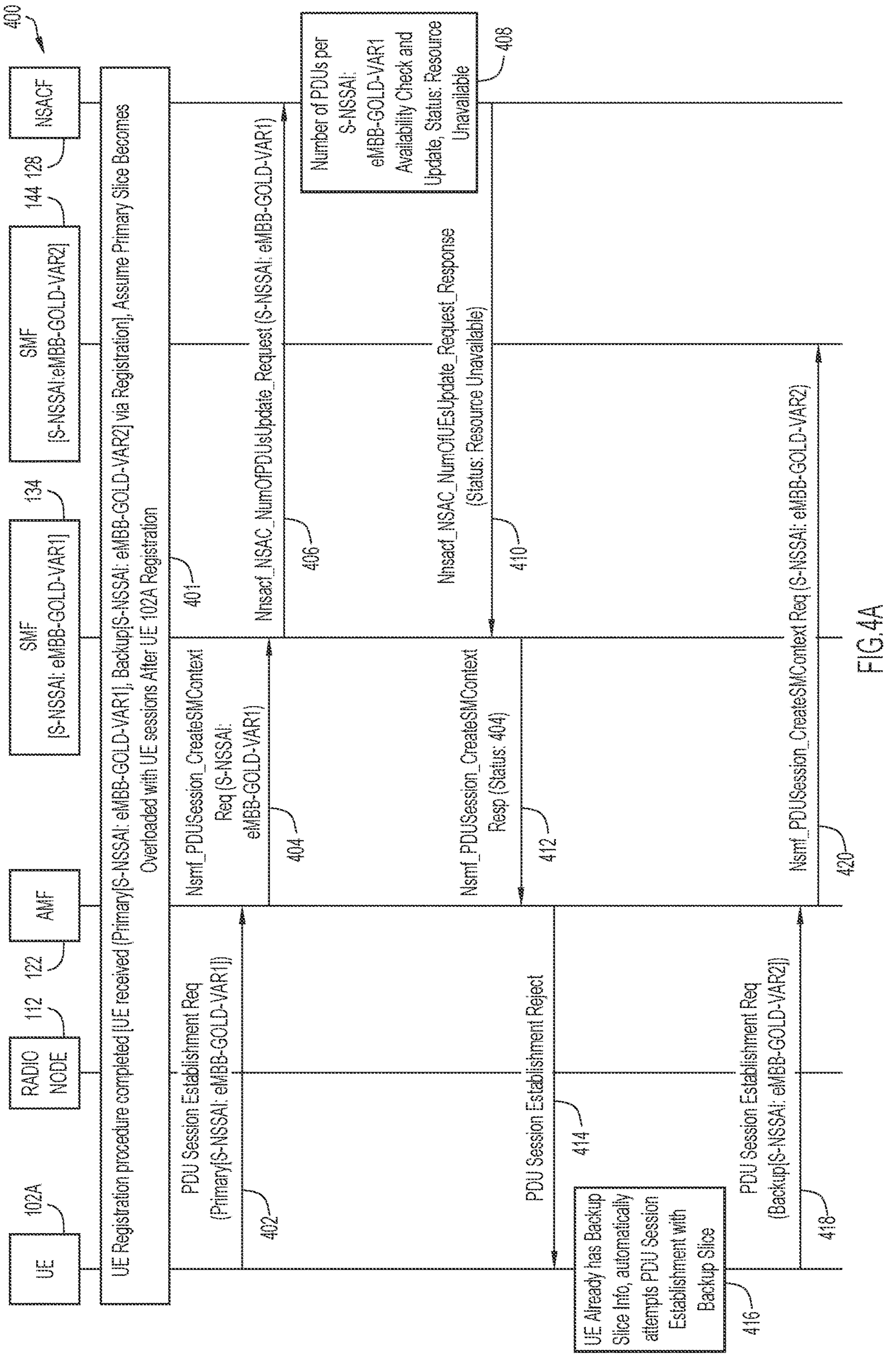
FIGS. 4A and 4B are a message sequence diagram illustrating various example operations that may be performed to facilitate network slice service continuity for a user equipment during protocol data unit (PDU) session establishment, according to an example embodiment.
Figure 4B:
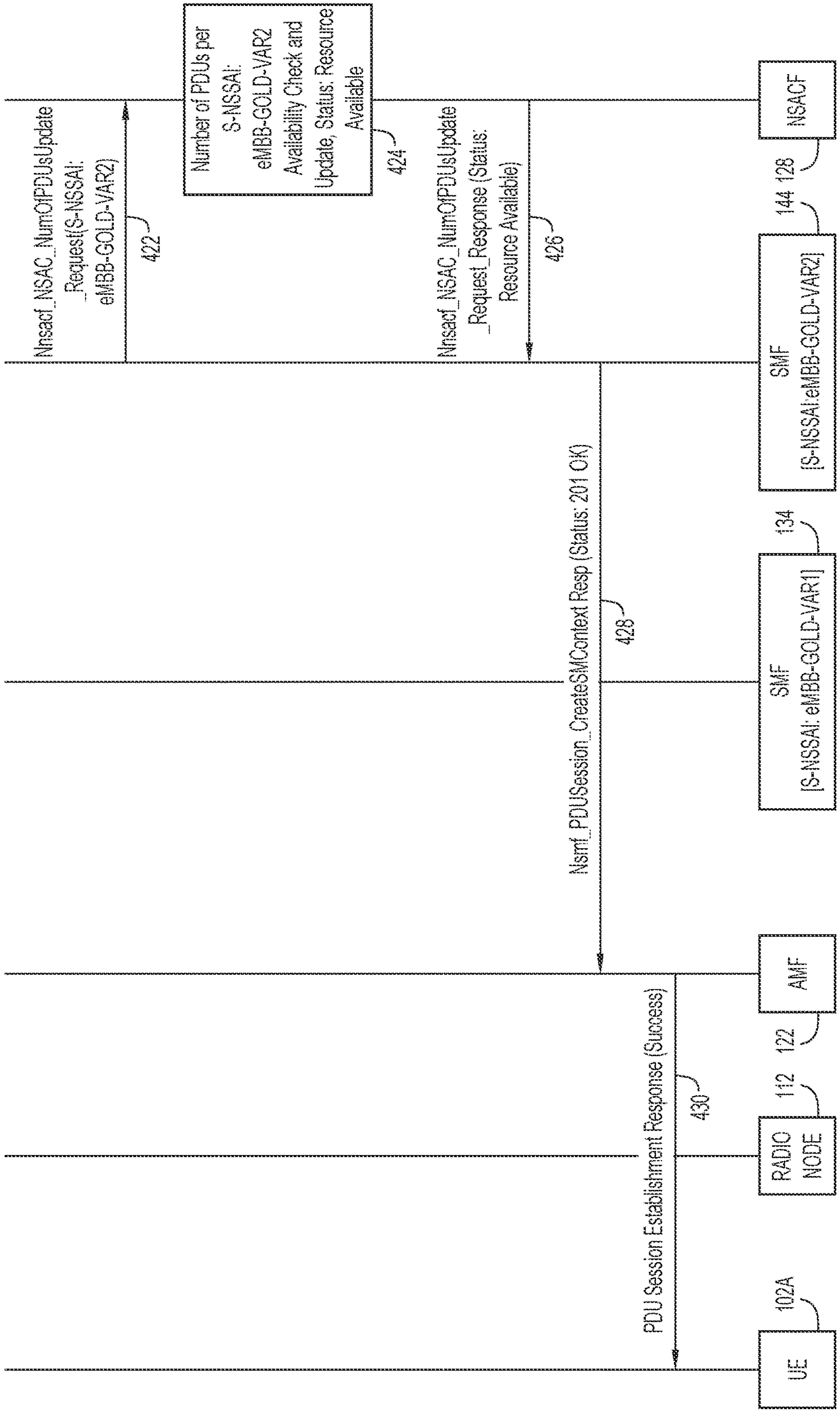

Consider other various example operations that can be performed via system 100 as shown via FIGS. 4A and 4B, which are a message sequence diagram 400 illustrating various example operations that may be performed to facilitate network slice service continuity for a user equipment during PDU session establishment, according to an example embodiment. For example, FIGS. 4A and 4B illustrate example operations that may be performed for a wireless device, such as UE 102A when UE 102A attempts to establish a PDU session via a network slice of mobile core network 120. FIGS. 4A and 4B include UE 102A, radio node 112, AMF 122, and NSACF 128. Also shown in FIGS. 4A and 4B are an SMF provided for each of network slice 130 and network slice 140, such as an SMF 134 that can be provided for network slice 130 (S-NSSAI: eMBB-GOLD-VAR1) and an SMF 144 that can be provided for network slice 140 (S-NSSAI: eMBB-GOLD-VAR2).

For the example of FIGS. 4A and 4B, as generally shown at 401, consider that UE 102A has completed registration with mobile core network 120 and has been provided, via a registration accept message (e.g., as shown at 228 of FIG. 2B), an indication that its registration is accepted for both of (primary) network slice 130 (S-NSSAI: eMBB-GOLD-VAR1) and (backup) network slice 140 (S-NSSAI: eMBB-GOLD-VAR2). Further for the example of FIGS. 4A and 4B, consider that following the UE 102A registration, that network slice 130 becomes overloaded with UE PDU sessions (but not necessarily UE registrations).

As shown at 402, consider that UE 102A sends a PDU session establishment request message to AMF 122, via radio node 112, indicating that UE 102A seeks to establish a PDU session with network slice 130 (S-NSSAI: eMBB-GOLD-VAR1), which triggers AMF 122 to send a request to SMF 134 to create a session management (SM) context for the UE 102A for the network slice 130, as shown at 404, requesting PDU session establishment for UE 102A via network slice 130. In at least one embodiment, the message sent from AMF 122 to SMF 134 may be a 'Nsmf_PDUSession_CreateSMContext_Request' message including the S-NSSAI for network slice 130 (S-NSSAI: eMBB-GOLD-VAR1) along with the SUPI/IMSI of UE 102A and/or any other applicable information.

Upon obtaining the PDU session establishment request involving UE 102A, the SMF 134 can perform a query towards NSACF 128, as shown at 406, to determine whether there is PDU session capacity/availability with regard to network slice 130 (S-NSSAI: eMBB-GOLD-VAR1) to host the PDU session for UE 102A. In order to perform the PDU session availability query involving network slice 130 the SMF 134, as shown at 406, can send a 'Nnsacf_NSAC_NumOfPDUsUpdate_Request' message to NSACF 128 identifying the (primary) network slice 130, 'S-NSSAI: eMBB-GOLD-VAR1'.

As generally shown at 408, the NSACF 128 can check the number of PDU sessions currently hosted for the (primary) network slice 130 (S-NSSAI: eMBB-GOLD-VAR1) to determine whether an additional PDU session (for UE 102A) can be hosted for the network slice. For the example of FIGS. 4A and 4B, the NSACF 128 can determine that there is no PDU session capacity available for the network slice 130 (Status: Resource Unavailable). Based on the determination that there is no available PDU session capacity for network slice 130, NSACF 128 communicates a 'Nnsacf_NSAC_NumberOfPDUsUpdate_Response' message to SMF 134, as shown at 410, indicating no available PDU session capacity for network slice 130 (e.g., 'Status: Resource Unavailable').

Upon receiving the indication that there is no PDU session capacity available for network slice 130, SMF 134 can send a response to the SM context request for AMF 122 in which the response, as shown at 412, can include a status code indicating that UE 102A is not allowed to establish a PDU session with network slice 130. In at least one embodiment, the response sent at 412 may be an 'Nsmf_PDUSession_CreateSMContext_Response' message including a status code '404' (or the like), along with the SUPI/IMSI for UE 102A and/or any other applicable information indicating that PDU session establishment is not allowed with regard to network slice 130, which can trigger AMF 122 to send a PDU session establishment reject message to UE 102A, as shown 414 regarding network slice 130.

In accordance with embodiments herein, because UE 102A received registration information for both of (primary) network slice 130 and (backup) network slice 140 via registration, UE 102A can, as generally illustrated at 416, automatically attempt to establish the PDU session with (backup) network slice 140 without having to perform a registration procedure for the network slice 140, which can save PDU session establishment time over conventional approaches. As noted above, the UE 102A (an any other UEs discussed for embodiments herein) can maintain a mapping between primary and backup network slices that provide the same network services (e.g., a mapping indicating that both (primary) S-NSSAI: eMBB-GOLD-VAR-1 and (backup) S-NSSAI: eMBB-GOLD-VAR2 provide the same network services) for which registration is accepted, such that the UE 102A can automatically perform PDU session establishment with the (backup) network slice 140.

For example, as shown at 418, UE 102A sends a PDU session establishment request message to AMF 122, via radio node 112, indicating that UE 102A seeks to establish a PDU session with network slice 140 (S-NSSAI: eMBB-GOLD-VAR2), which triggers AMF 122 to send a request to SMF 144 to create an SM context for the UE 102A for the network slice 140, as shown at 420, requesting PDU session establishment for UE 102A via network slice 140 (e.g., sending an 'Nsmf_PDUSession_CreateSMContext_Request' message including the S-NSSAI for network slice 140 (S-NSSAI: eMBB-GOLD-VAR2) along with the SUPI/IMSI of UE 102A and/or any other applicable information).

Upon obtaining the PDU session establishment request involving UE 102A, the SMF 144 can perform a query towards NSACF 128, as shown at 422 of FIG. 4B, to determine whether there is PDU session capacity/availability with regard to network slice 140 (S-NSSAI: eMBB-GOLD-VAR2) to host the PDU session for UE 102A (e.g., sending an 'Nnsacf_NSAC_NumOfPDUsUpdate_Request' message to NSACF 128 identifying the (backup) network slice 140, 'S-NSSAI: eMBB-GOLD-VAR2').

As generally shown at 424, the NSACF 128 can check the number of PDU sessions currently hosted for the (backup) network slice 140 (S-NSSAI: eMBB-GOLD-VAR2) to determine whether an additional PDU session (for UE 102A) can be hosted for the network slice. For the example of FIGS. 4A and 4B, the NSACF 128 can determine that there is PDU session capacity available for the network slice 140 (Status: Resource Available). Based on the determination that there is available PDU session capacity for network slice 140, NSACF 128 communicates a 'Nnsacf_NSAC_NumberOfPDUsUpdate_Response' message to SMF 144, as shown at 426, indicating that there is available PDU session capacity for network slice 140 (e.g., 'Status: Resource Available').

Upon receiving the indication that there is PDU session capacity available for network slice 140, SMF 144 can send a response to the SM context request for AMF 122 in which the response, as shown at 428, can include a status code indicating that UE 102A is allowed to establish a PDU session with network slice 130. In at least one embodiment, the response sent at 428 may be an 'Nsmf_PDUSession_CreateSMContext_Response' message including a status code '201 OK' (or the like), along with the SUPI/IMSI for UE 102A and/or any other applicable information indicating that PDU session establishment is allowed with regard to network slice 140, which can trigger AMF 122 to send a PDU session establishment response message to UE 102A, as shown 430 regarding successful PDU session establishment with (backup) network slice 140. Thereafter, UE 102A can perform data communications involving network slice 140.

Figure 5:
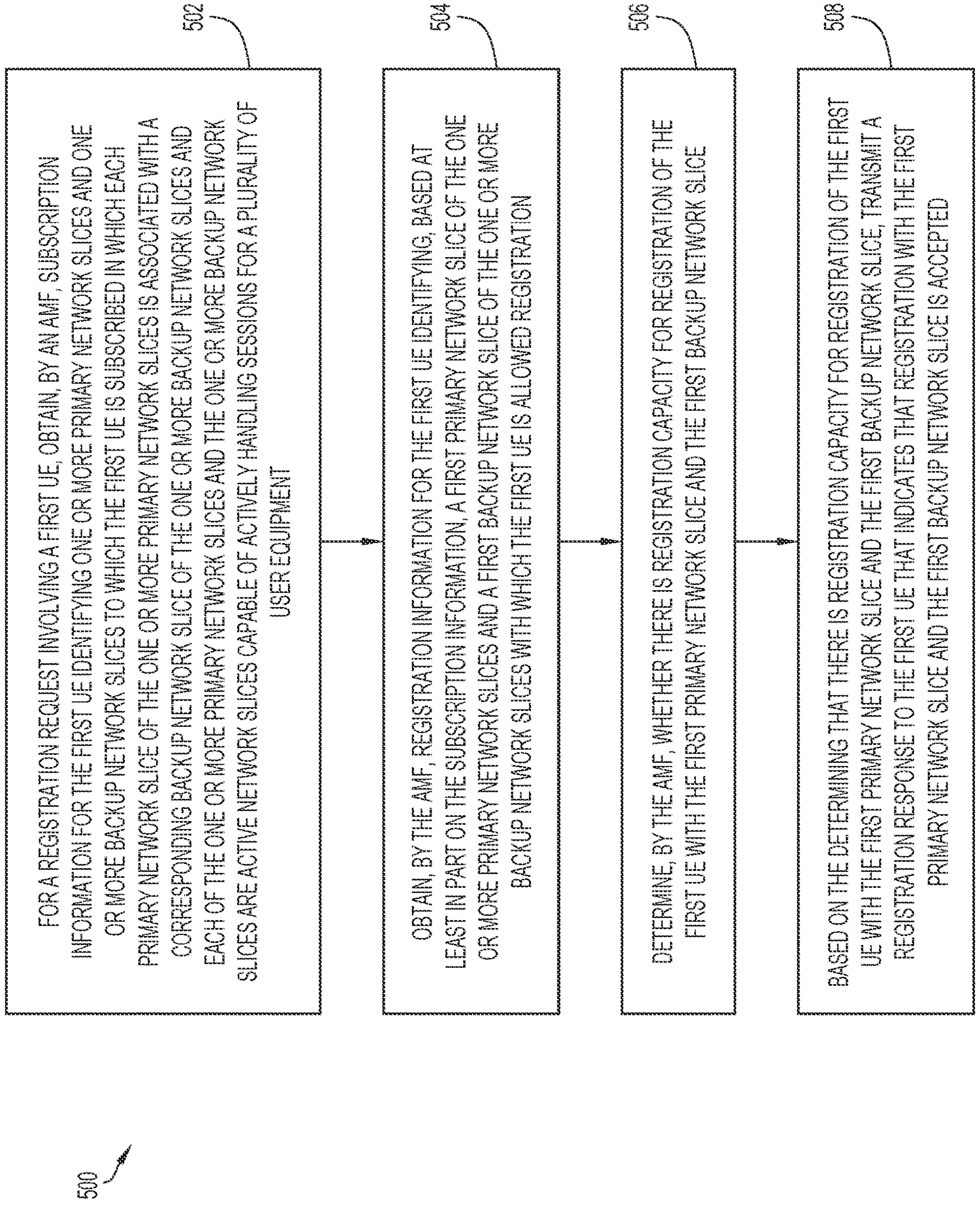
FIG. 5 is a flow chart depicting a method according to an example embodiment.

Referring to FIG. 5, FIG. 5 is a flow chart depicting a method 500 according to an example embodiment. In at least one embodiment, method 500 may be a computer-implemented method that is associated with operations that may be performed to facilitate network slice service continuity, according to an example embodiment. In at least one embodiment, method 500 may be performed by an AMF, such as AMF 122, as shown in FIGS. 1, 2A, 2B, 2C, 2D, 4A, and 4B.

At 502, the method may include, for a registration request involving a first UE, obtaining, by an AMF (e.g., AMF 122), subscription information for the first UE identifying one or more primary network slices and one or more backup network slices to which the first UE is subscribed in which each primary network slice of the one or more primary network slices is associated with a corresponding backup network slice of the one or more backup network slices and each of the one or more primary network slices and the one or more backup network slices are active network slices capable of actively handling sessions for a plurality of user equipment. The subscription information can be obtained from a UDM (e.g., UDM 124) that includes the subscription information for the first UE.

At 504, the method may include obtaining, by the AMF, registration information for the first UE identifying, based at least in part on the subscription information, a first primary network slice of the one or more primary network slices and a first backup network slice of the one or more backup network slices with which the first UE is allowed registration. The registration information can be obtained from an NSSF (e.g., NSSF 126).

At 506, the method may include determining, by the AMF, whether there is registration capacity for registration of the first UE with the first primary network slice and the first backup network slice. In at least one embodiment, the determining at 506 may include the AMF transmitting a query to an NSACF (e.g., NSACF) regarding registration of the first UE with the first primary network slice and the first backup network slice (e.g., an availability check and update procedure for each network slice) in which the NSACF is to provide an indication to the AMF regarding whether there is registration capacity for registration of the first UE with the first primary network slice and first backup network slice.

At 508, the method may include, based on the determining that there is registration capacity for registration of the first UE with the first primary network slice and the first backup network slice, transmitting a registration response to the first UE that indicates that registration with the first primary network slice and the first backup network slice is accepted.

Figure 6:
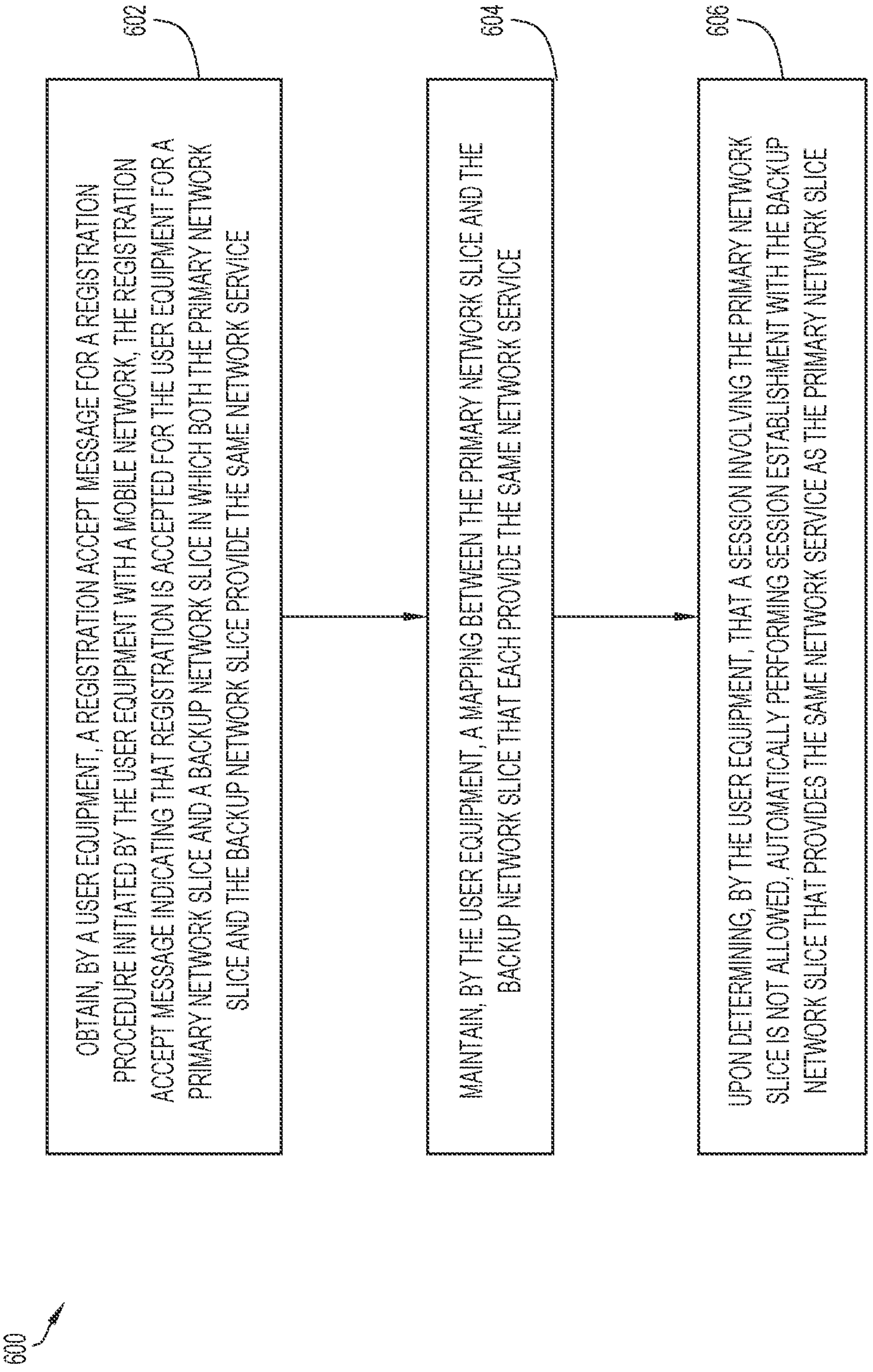
FIG. 6 is a flow chart depicting a method according to an example embodiment.

Referring to FIG. 6. FIG. 6 is a flow chart depicting a method 600 according to an example embodiment. In at least one embodiment, method 600 may be a computer-implemented method that is associated with operations that may be performed to facilitate network slice service continuity, according to an example embodiment. In at least one embodiment, method 600 may be performed by a UE, such as any of UE 102A, UE 102B, and/or UE 102C, as shown in FIGS. 1, 2A, 2B, 2C. 2D, 4A, and 4B.

At 602, the method may include obtaining, by a user equipment, a registration accept message for a registration procedure initiated by the user equipment with a mobile network, the registration accept message indicating that registration is accepted for the user equipment for a primary network slice and a backup network slice in which both the primary network slice and the backup network slice provide the same network service (e.g., an eMBB network service, a V2X network service, a network service in a first location and the same network service in a second location, etc.). Both the primary network slice and the backup network slice are active network slices that can host/handle PDU sessions for different user equipment at the same time.

In at least one embodiment, the registration accept message obtained at 602 may include a list of primary network slices and a list of backup network slices in which the order of primary network slices corresponds in a one-to-one manner with the order of the backup network slices such that each corresponding primary network slice in the primary network slice list corresponds to a corresponding backup network slice in the backup network slice list that provides the same network service (e.g., the first primary network slice in the primary network slice list provides the same network service as the first backup network slice in the backup network slice list, the second primary network slice in the primary network slice list provides the same network service as the second backup network slice in the backup network slice list, and so on).

As shown at 604, the method may include maintaining, by the user equipment, a mapping between the primary network slice and the backup network slice that each provide the same network service. In at least one embodiment, the maintaining by the user equipment can include maintaining a table, data structure, or the like that indicates the primary to backup network slice mapping.

As shown at 606, the method may include, upon determining, by the user equipment, that a session (e.g., a PDU session) involving the primary network slice is not allowed (e.g., PDU session establishment with the primary network slice is not allowed (e.g., due to capacity issues, the primary network slice being down, etc.), due to the user equipment moving out of the coverage area of the primary network slice, etc.), automatically performing session establishment (e.g., PDU session establishment) with the backup network slice that provides the same network service as the primary network slice. Automatically performing the session establishment with the backup network slice is performed by the user equipment at 606 without the user equipment performing another registration procedure with the mobile network involving the backup network slice (e.g., the user equipment automatically switches to the backup network slice (providing the same network service as the primary network slice) for PDU session establishment without performing another registration procedure with the mobile network involving the backup network slice).

Figure 7:
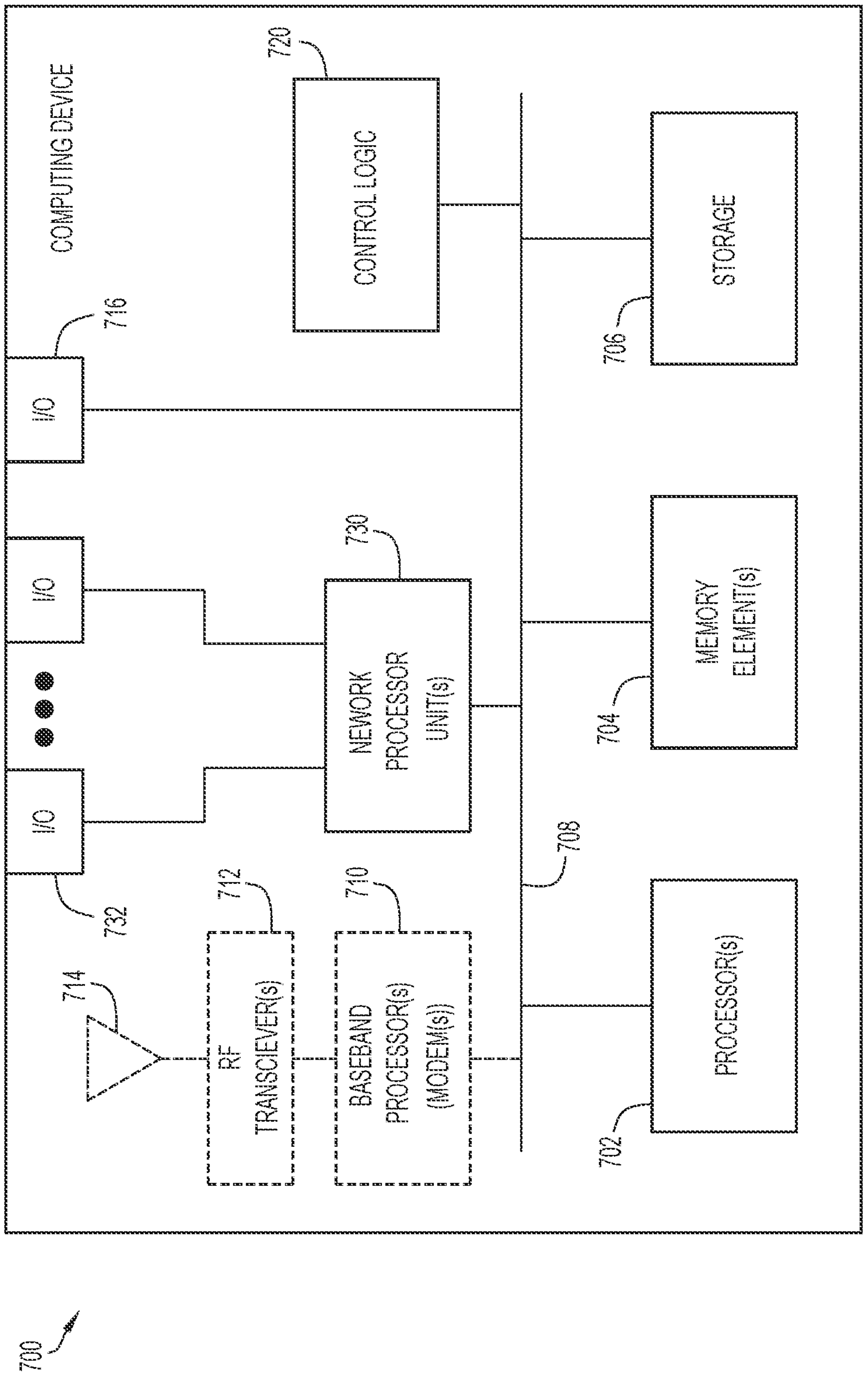
FIG. 7 illustrates a hardware block diagram of a computing device configured to perform functions associated with operations discussed in connection with embodiments herein.

Referring to FIG. 7, FIG. 7 illustrates a hardware block diagram of a computing device 700 that may perform functions associated with operations discussed herein in connection with the techniques described for embodiments herein. In various embodiments, a computing device or apparatus, such as computing device 700 or any combination of computing devices 700, may be configured as any entity/entities in order to perform operations of the various techniques discussed for embodiments herein, such as AMF 122, UDM 124 (which can be combined with a UDR), NSACF 128, UE 102A, UE 102B, UE 102C, radio node 112, any of VNFs 132, 142, SMF 134, SMF 144, and/or any other elements, functions, etc. discussed for embodiments herein.

In at least one embodiment, the computing device 700 may be any apparatus that may include one or more processor(s) 702, one or more memory element(s) 704, storage

706, a bus 708, one or more network processor unit(s) 730 interconnected with one or more network input/output (I/O) interface(s) 732, one or more I/O interface(s) 716, and control logic 720. In various embodiments, instructions associated with logic for computing device 700 can overlap in any manner and are not limited to the specific allocation of instructions and/or operations described herein.

For embodiments in which computing device 700 may be implemented as any device capable of wireless communications, computing device 700 may further include at least one baseband processor or modem 710, one or more radio RF transceiver(s) 712 (e.g., any combination of RF receiver(s) and RF transmitter(s)), one or more antenna(s) or antenna array(s) 714.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa) or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 730 may enable communication between computing device 700 and other systems, entities, etc., via network I/O interface(s) 732 (wired and/or wireless) to facilitate operations discussed for various embodiments described herein. In various embodiments, network processor unit(s) 730 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 732 can be configured as one or more Ethernet port(s), Fibre Channel ports, any other I/O port(s), and/or antenna(s)/antenna array(s) now known or hereafter developed. Thus, the network processor unit(s) 730 and/or network I/O interface(s) 732 may include suitable interfaces for receiving, transmitting, and/or otherwise communicating data and/or information (wired and/or wirelessly) in a network environment.

I/O interface(s) 716 allow for input and output of data and/or information with other entities that may be connected to computing device 700. For example, I/O interface(s) 716 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 700 is implemented as a wireless device or any apparatus capable of wireless communications, the RF transceiver(s) 712 may perform RF transmission and RF reception of wireless signals via antenna(s)/antenna array(s) 714, and the baseband processor or modem 710 performs baseband modulation and demodulation, etc. associated with such signals to enable wireless communications for computing device 700.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may facilitate network slice service continuity in a mobile network environment. For example, in one form a computer-implemented method is provided that may include, for a registration request involving a first user equipment (UE), obtaining, by an Access and Mobility Management Function (AMF), subscription information for the first UE identifying one or more primary network slices and one or more backup network slices to which the first UE is subscribed, wherein each primary network slice of the one or more primary network slices is associated with a corresponding backup network slice of the one or more backup network slices and each of the one or more primary network slices and the one or more backup network slices are active network slices capable of actively handling sessions for a plurality of user equipment; obtaining, by the AMF, registration information for the first UE identifying, based at least in part on the subscription information, a first primary network slice of the one or more primary network slices and a first backup network slice of the one or more backup network slices with which the first UE is allowed registration; determining, by the AMF, whether there is registration capacity for registration of the first UE with the first primary network slice and the first backup network slice; and based on the determining that there is registration capacity for registration of the first UE with the first primary network slice and the first backup network slice, transmitting a registration response to the first UE that indicates that registration with the first primary network slice and the first backup network slice is accepted.

The subscription information identifying the one or more primary network slices and the one or more backup network slices to which the first UE is subscribed is obtained from a Unified Data Management (UDM) entity. The registration information identifying the first primary network slice of the one or more primary network slices and the first backup network slice of the one or more backup network slices with which the first UE is allowed registration is obtained from a Network Slice Selection Function (NSSF).

In at least one instance, determining, by the AMF, whether there is registration capacity for registration of the first UE with the first primary network slice comprises: performing a query towards a Network Slice Admission Control Function (NSACF) regarding registration of the first UE with the first primary network slice and the first backup network slice, wherein the NSACF is to provide an indication to the AMF regarding whether there is registration capacity for registration of the first UE with the first primary network slice and the first backup network slice.

In at least one instance, the query subscribes the AMF to receive a notification from the NSACF if a capacity threshold is met for the first primary network slice or the first backup network slice after it is determined, at a time of the query, that there is registration capacity for registration of the first UE with the first primary network slice and the first backup network slice.

In at least one instance, the method may further include, after obtaining a first indication from the NSACF indicating that there is registration capacity for the registration of the first UE with the first primary network slice and the first backup network slice, obtaining a notification from the NSACF indicating that the capacity threshold for the first primary network slice is met. In at least one instance, for a registration request involving a second UE, based on determining, by the AMF, that the second UE is allowed registration with the first primary network slice and the first backup network slice, determining, based on the notification, that there is not registration capacity for registration of the second UE with the first primary network slice; and performing a query towards the NSACF regarding registration of the second UE with the first backup network slice, wherein the NSACF is to provide an indication to the AMF regarding whether there is registration capacity for registration of the second UE with first backup network slice.

In at least one instance, the method may further include, based on the determining that there is registration capacity for registration of the second UE with the first backup network slice, transmitting a registration response message to the second UE that indicates that registration with the first backup network slice is accepted and the first primary network slice is not identified in the registration response.

In at least one instance, the first primary network slice and the first backup network slice are configured to provide network services that are the same. In at least one instance, the first primary network slice is operated by a first mobile network operator and the first backup network slice is operated by a second mobile network operator that is different than the first mobile network operator.

Variations and Implementations

Generally, per-3GPP standards for a mobile core network, such as may be implemented via instantiated network slices as shown in FIG. 1 in some embodiments, an AMF interfaces with a Session Management Function (SMF) which can further interface with one or more UPFs. An AMF and an SMF can further interface with a Policy Control Function (PCF), a UDM/UDR, and various other core network functions (e.g., an NSSF, an NSACF, etc.) via 3GPP Service- Based Interface (SBI) constructs/interfaces. An AMF and a UPF can further interface with a RAN node, such as one or more gNBs (e.g., radio node 112) or disaggregated components thereof (e.g., a CU).

One or more wireless device sessions, often referred to as PDU sessions can be established between a wireless device and a UPF for a core network in which the session may be facilitated/managed by an SMF, as is generally understood in the art.

Generally, a radio access may include one or more radio access network (RAN) radio nodes that may implement a wireless wide area (WWA) (e.g., cellular) air interface and, in some instances also a wireless local area (WLA) (e.g., Wi-Fi®) air interface, for any combination of Radio Access Technology (RAT) types (e.g., 'accesses'), such as 3GPP WWA licensed spectrum accesses (e.g., Fourth Generation/Long Term Evolution (4G/LTE), 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, a WWAN RAN radio node may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more wireless devices (e.g., UEs 102A, 102B, and 102C), may utilize to connect for one or more sessions (e.g., voice/IMS, data/internet (e.g., video, gaming, etc.), combinations thereof, etc.).

A wireless device, such as any of UE 102A, UE 102B, UE 102C, or any other wireless devices discussed herein, may be considered any electronic device, etc. that initiates a connection or communication session with a corresponding core network, and may be inclusive of but not limited to a computer, a mobile phone or mobile communication device, an electronic tablet, a laptop, etc., an electronic device such as an industrial device (e.g., a robot), automation device, enterprise device, appliance, Internet of Things (IoT) device, a router with a WWA/WLA interface, a WWA/WLA (cellular/Wi-Fi®) enabled device. and/or any other device, component, element, or object capable of initiating voice, audio, video, media, or data exchanges within a system. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of one or more RAN(s).

Generally, an AMF may facilitate access and mobility management control/services for one or more wireless devices seeking connection to/connected to a mobile core network. Generally, an SMF may be responsible for wireless device session management, with individual functions/services being supported on a per-session basis in order to facilitate data transfer(s) between a wireless device and one or more networks via one or more UPFs. Generally, a UPF may operate to provide packet routing and forwarding operations for user data traffic and may also perform a variety of functions such as packet inspection, traffic optimization, Quality of Service (QoS), policy enforcement and user data traffic handling (e.g., to/from one or more data networks), billing operations (e.g., accounting, etc.), among other operations, for wireless device sessions. Typically, a UDM stores subscription data (typically in combination with a Unified Data Repository (UDR)) for subscribers (e.g., a user that may be associated with a given wireless device) that can be retrieved and/or otherwise obtained/utilized during operation of a core network system. Typically, an NRF provides support for network function (NF) management (e.g., registering, deregistering, updating services to NFs/NF services), NF discovery (e.g., enabling NF service consumer(s) to discover a set of NF instances with a specific NF service/NF type and/or to discover a specific NF service), and NF access (e.g., NF authorization), among others as provided via 3GPP standards.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

receiving a registration request from a first user equipment (UE) and obtaining, by an Access and Mobility Management Function (AMF), subscription information for the first UE identifying that a slice continuity service is enabled for the UE for one or more primary network slices and one or more backup network slices to which the first UE is subscribed, wherein each primary network slice of the one or more primary network slices is associated with a corresponding backup network slice of the one or more backup network slices that provide a same network service and each of the one or more primary network slices and the one or more backup network slices are active network slices capable of actively handling sessions for a plurality of user equipment;

obtaining, by the AMF from a Network Slice Selection Function (NSSF) following a query to the NSSF by the AMF, registration information for the first UE identifying, based at least in part on a location of the UE and the subscription information, a first primary network slice of the one or more primary network slices and a first backup network slice of the one or more backup network slices with which the first UE is allowed registration;

determining, by the AMF based on an indication obtained from a Network Slice Admission Control Function (NSACF) following a query to the NSACF by the AME, whether there is registration capacity for registration of the first UE with the first primary network slice and the first backup network slice, wherein the query subscribes the AMF to receive notifications from the NSACF indicating if a capacity threshold is met for the first primary network slice or the first backup network slice; and based on the determining that there is registration capacity for registration of the first UE with the first primary network slice and the first backup network slice, transmitting a registration response to the first UE that indicates that registration with the first primary network slice and the first backup network slice is accepted.

2. The method of claim 1, wherein the NSACF is to provide an indication to the AMF regarding whether there is registration capacity for registration of the first UE with the first primary network slice and the first backup network slice.

3. The method of claim 2, wherein the query subscribes the AMF to receive notification from the NSACF if the capacity threshold is met for the first primary network slice or the first backup network slice after it is determined, at a time of the query, that there is registration capacity for registration of the first UE with the first primary network slice and the first backup network slice.

4. The method of claim 3, further comprising:

after obtaining a first indication from the NSACF indicating that there is registration capacity for the registration of the first UE with the first primary network slice and the first backup network slice, obtaining a notification from the NSACF indicating that the capacity threshold for the first primary network slice is met.

5. The method of claim 4, further comprising:

for a registration request involving a second UE, based on determining, by the AMF, that the second UE is allowed registration with the first primary network slice and the first backup network slice, determining, based on the notification obtained from the NSACF that there is not registration capacity for registration of the second UE with the first primary network slice; and performing a query towards the NSACF regarding registration of the second UE with the first backup network slice, wherein the NSACF is to provide an indication to the AMF regarding whether there is registration capacity for registration of the second UE with first backup network slice.

6. The method of claim 5, further comprising:

based on the determining that there is registration capacity for registration of the second UE with the first backup network slice, transmitting a registration response message to the second UE that indicates that registration with the first backup network slice is accepted and the first primary network slice is not identified in the registration response.

7. The method of claim 1, wherein the first primary network slice and the first backup network slice are each operated by different mobile network operators.

8. The method of claim 1, wherein the subscription information is obtained from a Unified Data Management (UDM) entity via a query response message that includes an enhanced Network Slice Selection Assistance Information (NSSAI) data type that includes a BackupsingleNssais data element that identifies the one or more backup network slices to which the first UE is subscribed.

9. The method of claim 1, wherein the query to the NSSF by the AMF is a query message that includes an enhanced SliceInfoForRegistration data type that includes a BackupsubscribedNssai information element that identifies the one or more backup network slices to which the first UE is subscribed.

10. The method of claim 9, wherein the registration information is included in a query response message obtained by the AMF from the NSSF that includes an enhanced AuthorizedNetworkSliceInfo data type that includes a BackupallowedNssaiList information element that identifies the one or more backup network slices with which the first UE is allowed registration.

11. One or more non-transitory computer readable storage media encoded with instructions that, when executed by a processor, cause the processor to perform operations, comprising:

receiving a registration request from a first user equipment (UE) and obtaining, by an Access and Mobility Management Function (AMF), subscription information for the first UE identifying that a slice continuity service is enabled for the UE for one or more primary network slices and one or more backup network slices to which the first UE is subscribed, wherein each primary network slice of the one or more primary network slices is associated with a corresponding backup network slice of the one or more backup network slices that provide a same network service and each of the one or more primary network slices and the one or more backup network slices are active network slices capable of actively handling sessions for a plurality of user equipment;

obtaining, by the AMF from a Network Slice Selection Function (NSSF) following a query to the NSSF by the AME, registration information for the first UE identifying, based at least in part on a location of the UE and the subscription information, a first primary network slice of the one or more primary network slices and a first backup network slice of the one or more backup network slices with which the first UE is allowed registration;

determining, by the AMF based on an indication obtained from a Network Slice Admission Control Function (NSACF) following a query to the NSACF by the AMF, whether there is registration capacity for registration of the first UE with the first primary network slice and the first backup network slice, wherein the query subscribes the AMF to receive notifications from the NSACF indicating if a capacity threshold is met for the first primary network slice or the first backup network slice; and based on the determining that there is registration capacity for registration of the first UE with the first primary network slice and the first backup network slice, transmitting a registration response to the first UE that indicates that registration with the first primary network slice and the first backup network slice is accepted.

12. The media of claim 11, wherein the NSACF is to provide an indication to the AMF regarding whether there is registration capacity for registration of the first UE with the first primary network slice and the first backup network slice.

13. The media of claim 12, wherein the query subscribes the AMF to receive the notification from the NSACF if the capacity threshold is met for the first primary network slice or the first backup network slice after it is determined, at a time of the query, that there is registration capacity for registration of the first UE with the first primary network slice and the first backup network slice.

14. The media of claim 13, further comprising instructions that, when executed by a processor, cause the processor to perform further operations, comprising:

after obtaining a first indication from the NSACF indicating that there is registration capacity for the registration of the first UE with the first primary network slice and the first backup network slice, obtaining a notification from the NSACF indicating that the capacity threshold for the first primary network slice is met.

15. The media of claim 14, further comprising instructions that, when executed by a processor, cause the processor to perform further operations, comprising:

for a registration request involving a second UE, based on determining, by the AMF, that the second UE is allowed registration with the first primary network slice and the first backup network slice, determining, based on the notification obtained from the NSACF that there is not registration capacity for registration of the second UE with the first primary network slice; and performing a query towards the NSACF regarding registration of the second UE with the first backup network slice, wherein the NSACF is to provide an indication to the AMF regarding whether there is registration capacity for registration of the second UE with first backup network slice.

16. A system comprising:

at least one memory element for storing data; and at least one processor for executing instructions associated with the data, wherein executing the instructions causes the system to perform operations, comprising:

receiving a registration request from a first user equipment (UE) and obtaining, by an Access and Mobility Management Function (AMF), subscription information for the first UE identifying that a slice continuity service is enabled for the UE for one or more primary network slices and one or more backup network slices to which the first UE is subscribed, wherein each primary network slice of the one or more primary network slices is associated with a corresponding backup network slice of the one or more backup network slices that provide a same network service and each of the one or more primary network slices and the one or more backup network slices are active network slices capable of actively handling sessions for a plurality of user equipment;

obtaining, by the AMF from a Network Slice Selection Function (NSSF) following a query to the NSSF by the AME, registration information for the first UE identifying, based at least in part on a location of the UE and the subscription information, a first primary network slice of the one or more primary network slices and a first backup network slice of the one or more backup network slices with which the first UE is allowed registration;

determining, by the AMF based on an indication obtained from a Network Slice Admission Control Function (NSACF) following a query to the NSACF by the AMF, whether there is registration capacity for registration of the first UE with the first primary network slice and the first backup network slice, wherein the query subscribes the AMF to receive notifications from the NSACF indicating if a capacity threshold is met for the first primary network slice or the first backup network slice; and based on the determining that there is registration capacity for registration of the first UE with the first primary network slice and the first backup network slice, transmitting a registration response to the first UE that indicates that registration with the first primary network slice and the first backup network slice is accepted.

17. The system of claim 16, wherein the NSACF is to provide an indication to the AMF regarding whether there is registration capacity for registration of the first UE with the first primary network slice and the first backup network slice.

18. The system of claim 17, wherein the query subscribes the AMF to receive the notification from the NSACF if the capacity threshold is met for the first primary network slice or the first backup network slice after it is determined, at a time of the query, that there is registration capacity for registration of the first UE with the first primary network slice and the first backup network slice.

19. The system of claim 18, wherein executing the instructions causes the system to perform further operations, comprising:

after obtaining a first indication from the NSACF indicating that there is registration capacity for the registration of the first UE with the first primary network slice and the first backup network slice, obtaining a notification from the NSACF indicating that the capacity threshold for the first primary network slice is met.

20. The system of claim 19, wherein executing the instructions causes the system to perform further operations, comprising:

for a registration request involving a second UE, based on determining, by the AMF, that the second UE is allowed registration with the first primary network slice and the first backup network slice, determining, based on the notification obtained from the NSACF that there is not registration capacity for registration of the second UE with the first primary network slice; and performing a query towards the NSACF regarding registration of the second UE with the first backup network slice, wherein the NSACF is to provide an indication to the AMF regarding whether there is registration capacity for registration of the second UE with first backup network slice.

* * * * *